US009626344B1

(12) United States Patent
Boynes

(10) Patent No.: US 9,626,344 B1
(45) Date of Patent: Apr. 18, 2017

(54) CONDITIONAL PROMOTION THROUGH PACKET REORDERING

(71) Applicant: AMAZON TECHNOLOGIES, INC., Reno, NV (US)

(72) Inventor: Jeremy Boynes, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 811 days.

(21) Appl. No.: 14/032,006

(22) Filed: Sep. 19, 2013

(51) Int. Cl.
*G06F 17/24* (2006.01)
*G06F 17/22* (2006.01)
*G06F 17/26* (2006.01)

(52) U.S. Cl.
CPC ................. *G06F 17/2247* (2013.01)

(58) Field of Classification Search
CPC ........................................ G06F 17/00
USPC ............................................... 715/234
See application file for complete search history.

(56) References Cited

U.S. PATENT DOCUMENTS

| 5,572,643 | A | 11/1996 | Judson | |
|---|---|---|---|---|
| 6,011,537 | A | 1/2000 | Slotznick | |
| 6,430,160 | B1* | 8/2002 | Smith | H04L 1/242 370/231 |
| 6,976,085 | B1* | 12/2005 | Aviani | H04L 67/2804 709/232 |
| 8,103,742 | B1* | 1/2012 | Green | G06F 17/30893 709/218 |
| 8,548,848 | B1 | 10/2013 | Shaw et al. | |
| 9,098,477 | B2 | 8/2015 | Joel et al. | |
| 9,166,864 | B1 | 10/2015 | Galligan et al. | |
| 2004/0052234 | A1* | 3/2004 | Ameigeiras | H04L 1/1642 370/338 |
| 2005/0165985 | A1* | 7/2005 | Vangal | G06F 13/4027 710/107 |
| 2006/0075336 | A1 | 4/2006 | Gawor et al. | |
| 2008/0271046 | A1 | 10/2008 | Lipton et al. | |

(Continued)

FOREIGN PATENT DOCUMENTS

JP 11232203 8/1999

OTHER PUBLICATIONS

Garmon, Brian, "Final Office Action dated Jun. 24, 2016", U.S. Appl. No. 14/032,035, The United States Patent and Trademark Office, Jun. 24, 2016.

(Continued)

*Primary Examiner* — James J Debrow
(74) *Attorney, Agent, or Firm* — Lindauer Law, PLLC

(57) ABSTRACT

Techniques are described for promoting content items in a page to load in a different order than the order in which they were initially designated to load in the page source. A page may include critical content items designated to load earlier than non-critical content items. In instances where there is a delay due to latency in generating or retrieving the critical content items, one or more non-critical content items may be promoted to be sent earlier than initially designated. Promotion may include packet reordering, such that packets including non-critical content items are sent to a user device prior to the packets that include critical content items. By promoting non-critical content items to be sent during the period in which the loading of the page may otherwise be stalled, overall page load times may be reduced.

20 Claims, 19 Drawing Sheets

(56) References Cited

U.S. PATENT DOCUMENTS

| | | | |
|---|---|---|---|
| 2010/0161787 A1* | 6/2010 | Jones | G06F 11/3495 709/224 |
| 2010/0281539 A1* | 11/2010 | Burns | H04L 63/1441 726/23 |
| 2012/0066586 A1 | 3/2012 | Shemesh | |
| 2012/0079057 A1 | 3/2012 | Fainberg et al. | |
| 2012/0144288 A1 | 6/2012 | Caruso et al. | |
| 2012/0192080 A1 | 7/2012 | Lloyd | |
| 2014/0304576 A1 | 10/2014 | Walton | |
| 2015/0026239 A1 | 1/2015 | Hofmann et al. | |

OTHER PUBLICATIONS

Edwards, Jason T., "Non-Final Office Action dated Dec. 17, 2015", U.S. Appl. No. 14/032,069, The United States Patent and Trademark Office, Dec. 17, 2015.

Garmon, Brian, "Non-Final Office Action dated Jan. 15, 2016", U.S. Appl. No. 14/032,035, The United States Patent and Trademark Office, Jan. 15, 2016.

Edwards Jason, T., "Final Office Action dated Jun. 16, 2016", U.S. Appl. No. 14/032,069, The United States Patent and Trademark Office, Jun. 16, 2016.

Reagan, James a., "Notice of Allowance dated Nov. 22, 2016", U.S. Appl. No. 14/031,856, The United States Patent and Trademark Office, Nov. 22, 2016.

Edwards, Jason, T., "Advisory Action dated Sep. 2, 2016", U.S. Appl. No. 14/032,069, The United States Patent and Trademark Office, Sep. 2, 2016.

Reagan, James, A., "Non-final Office Action dated Aug. 3, 2013", U.S. Appl. No. 14/031,952, The United States Patent and Trademark Office, Aug. 3, 2016.

Reagan, James, A., "Non-final Office action dated Jul. 21, 2016", U.S. Appl. No. 14/031,856, The United States Patent and Trademark Office, Jul. 21, 2016.

* cited by examiner and the page wrap from 4em which is dp in w rrefully text. per# CONDITIONAL PROMOTION THROUGH PACKET REORDERING

BACKGROUND

With the increasing number and variety of products available for purchase over the World Wide Web, more users are opting to purchase products and services online instead of patronizing more traditional, brick-and-mortar businesses. As network capacities and device capabilities improve, customers who shop online may come to expect faster presentation of content describing products and services of interest. In many cases, a delay in loading the content of a web page may lead to a potential customer growing impatient and navigating away from the site, resulting in lost business.

Figure 1:
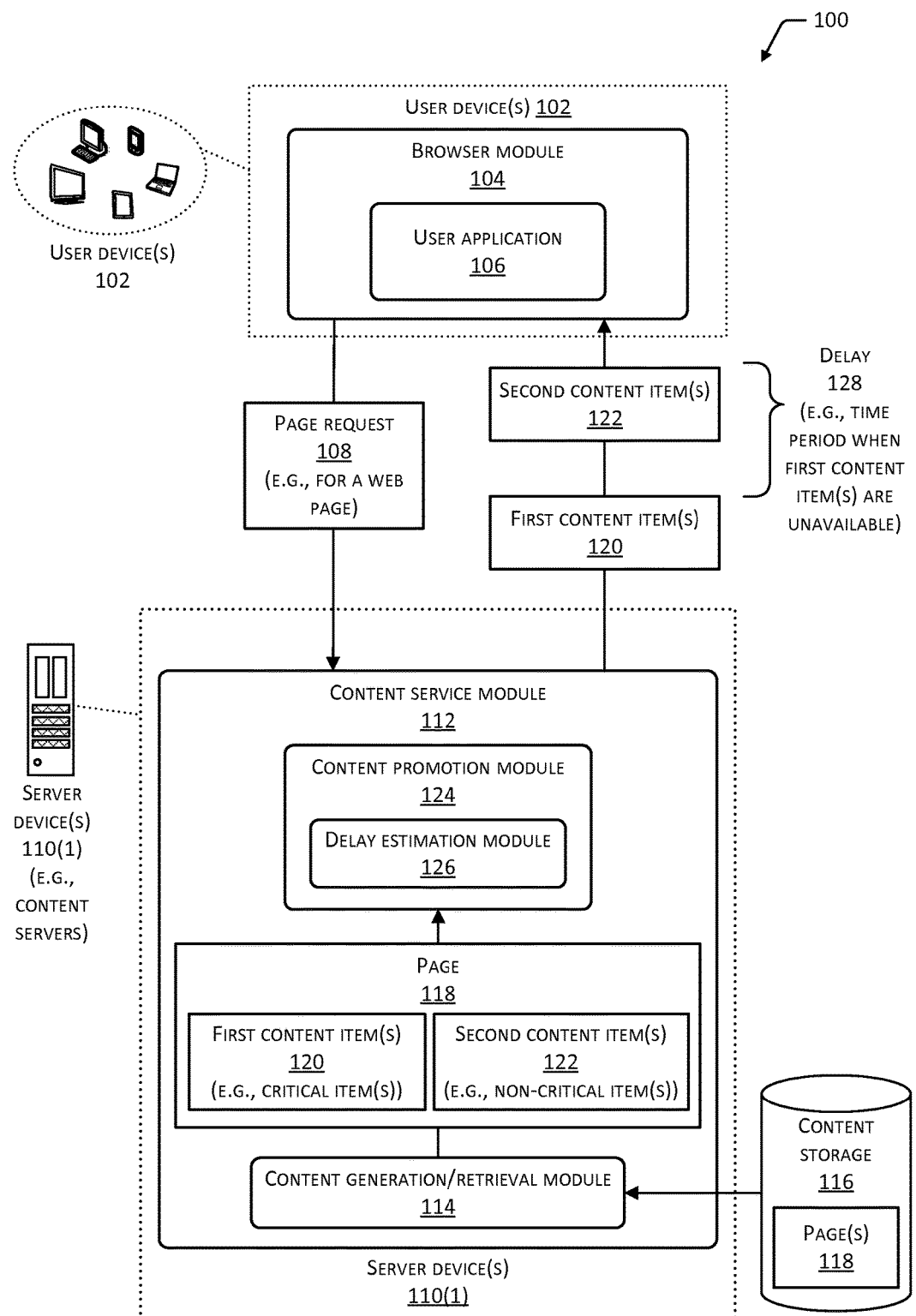
FIG. 1 depicts an environment for delivering content included in a page, the environment including a content server device that performs operations to promote non-critical content items to load prior to critical content items when the availability of the critical content items is delayed.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for promoting content items in a page to load in a different order than the order in which they were initially designated to load in the source of the page, enabling the page as a whole to load faster. A page may include one or more first content items that are initially designated to load earlier during the presentation of the page through a web browser, a user agent, or some other type of application executing on a user device. The page may also include one or more second content items that are initially designated to load following the first content item(s). For example, in cases where the page is a web page that is configured to be presented in a web browser, the first content item(s) may be included in the head section of the Hypertext Markup Language (HTML) source or other description of the page. The second content item(s) may be included in the body section of the page, such that they are initially designated to load following the first content item(s). In some cases, the second content item(s) may be designated to load in response to a particular event, such as a JavaScript onload event that is triggered when a user agent (e.g., a web browser) has substantially completed loading the other content items in a page. In such cases, an event handler of the user agent may detect the onload event and load one or more second content items that are designated to load in response to the onload event.

In some cases, the first content item(s) may include critical content items that are designated to load earlier when the page is presented. Critical content items may include content that is a goal or a purpose of the user's browsing experience. For example, on an e-commerce web site a user may be seeking information describing a particular product that the user may be interested in purchasing. Accordingly, critical content items may include images of the product, descriptions of the product, information regarding the price or availability of the product, customer or expert reviews of the product, and so forth. In some cases, the user's interest in a product may be inferred or otherwise determined based on a history of searches requested by the user, the user's page view history on one or more web sites, demographic or other characteristics of the user, and so forth. Critical content items may also include content items which, when loaded earlier on a page, have been shown to increase the probability of a completed transaction (e.g., a purchase) through the page. Such a determination may be based on click-through data, transaction data, or other data describing the previous interactions of one or more users with one or more pages.

Critical content items may also include content items that are designated to load earlier when a page is presented because such content items enable the loading of other content. For example, a navigation bar on one or more pages of a web site may be divided into two portions. A first portion may include content that is visible near the top of the page when displayed. In some cases, such content may be designated to load earlier to enable other content on the page to load and to not be blocked. The second portion may include content that may be loaded later, such as other parts of a navigation bar, menu items or navigation items on the navigation bar, data that is displayed as fly-out data, mouse-over data, other types of data not immediately visible on the page when it is loaded, and so forth. In some cases, one or more elements of a page (e.g., navigation bars or menus) may be loaded to enable product information to be presented. Accordingly, critical content items may include content items that are loaded to enable the loading of other critical content items such as product information.

A web page may include resources that are loaded in conjunction with the page, such as JavaScript files, Cascading Style Sheet (CSS) files, or other types of rich or dynamic content. In many cases, web page designers may be presented with a choice whether to load such resources earlier during page presentation to improve the user's visual experience, or to prioritize the loading of critical content items such as product information. In some cases, the critical content items may be prioritized as first content items, and the other content resources (e.g., CSS files, JavaScript files, and so forth), may be designated to load later as second content items.

Although a page may be initially designed such that critical content items are to be loaded earlier than non-critical content items, in some cases there may be a delay from a time when the user initially requests a page until the critical content items are available to load. Such a delay may be associated with one or more of the following: a time during which a server device (e.g., a content server or backend server) dynamically generates one or more of the critical content items; a latency in retrieving one or more of the critical content items from storage in memory; a time to transmit one or more of the critical content items from a server device to a user device where the page is to be presented, or between various server devices (e.g., from a backend server to an edge server, and so forth); or a time to load and present the critical content items on the user device after they have been received at the user device. Because the critical content items may be designated to load first in a web page, or to load earlier than non-critical content items, the delayed availability of the critical content items may result in a stall or interruption in the loading of the page on the user device.

Implementations provide for the promotion of one or more non-critical content items, such that the non-critical content item(s) are loaded during the delay when the critical content items are unavailable. In some implementations, the critical content item(s) may be initially designated (e.g., in an initial version of the page) to load in the head section, and the non-critical content item(s) may be initially designated to load following the head section such as in response to a JavaScript onload event. In such cases, the promotion of one or more non-critical content items may include altering the delivery of the non-critical content item(s) so that they are loaded in the head section. Alternatively, the promotion of one or more non-critical content items may include modifying the source of the page to specify the non-critical content item(s) at a different location or in a different section of the Document Object Model (DOM) of the page. Because the time period during the delay may be otherwise unutilized for loading content, implementations may provide for a more efficient or faster overall loading of pages. In some cases, the promotion of the non-critical content items for earlier loading may not result in a further delay in the loading of the critical content items, beyond the delay in loading the critical content items that may have resulted regardless of the promotion.

Although the examples herein may describe the promotion of non-critical content items to load prior to critical content items when the availability of the critical content items is delayed, implementations are not so limited. Implementations support the promotion of any type of second content items to load prior to any type of first content items when presenting a page that includes the first content items and the second content items that are initially designated to load in a particular order. For example, first content items may describe any content items that are initially designated to load earlier than the second content items during the presentation of a page.

In some implementations, pages may include web pages that are described using any version of HTML, Dynamic HTML (DHTML), or other languages. Implementations may support content item promotion in pages that are described using any language in which the ordering of the loading of content items is based at least partly on an order in which the content items are referenced in the specification, description, or source of the page. Pages may also include dynamic or rich content that is provided through the use of JavaScript files, CSS files, and so forth. Although the examples herein may describe pages as web pages specified in HTML, JavaScript, CSS, and so forth, implementations are not so limited. Implementations provide for the promotion of content items that are included in any type of page and that may be subject to incremental delivery to a user device for presentation. For example, implementations may support pages that include other types of content such as Scalable Vector Graphics (SVG), Virtual Reality Modeling Language (VRML), Extensible Markup Language (XML) content in which elements may be delivered in various sequences, and so forth. Content items, such as the first content items and the second content items described herein, may be any type of data, including but not limited to the following: formatted or unformatted text; numeric data of any type; multimedia content such as images, audio, video, graphics, or haptic output data; metadata; executable code such as JavaScript or CSS; and so forth.

Delivery of the content of a page may be performed using a communication protocol that operates at any level of a multi-layer communications model such as the Open Systems Interconnection (OSI) model. For example, content delivery may be performed using a protocol that primarily operates at the application layer, such as any version of the Hypertext Transfer Protocol (HTTP). Alternatively, content delivery may be performed using a protocol that primarily operates at the transport or Internet layer, or any other layer of the OSI model.

In some implementations, content delivery may be performed using a multi-stream networking protocol. Utilizing such a protocol, a plurality of content delivery streams may be delivered to a client device such as a user device, through the multiplexing of a plurality of data streams. Such multiplexing may include the interleaving of data frames from the plurality of streams of concurrent streams across a single channel or connection, e.g., across a single Transmission Control Protocol (TCP) connection. In some cases, the multiplexing may be time-based multiplexing, such that the data frames from the plurality of streams are interleaved in time. By multiplexing multiple streams, the multi-stream networking protocol may reduce latency in communications, and may efficiently deliver information such as web content over a single connection to the client device. The multi-stream networking protocol may operate at the application layer, session layer, or any other layer of the OSI model. In some implementations the multi-stream networking protocol may be any version of SPDY™, developed primarily at Google® Inc. of Mountain View, Calif., USA. Implementations support the use of any multi-stream networking protocol that multiplexes frames from multiple streams, and that operates at any level of the OSI model.

FIG. 1 depicts an environment 100 for delivering content included in a page, the environment 100 including a content server device or other type of server device that performs operations to promote second content items (e.g., non-critical content items) to load prior to first content items (e.g., critical content items) when the availability of the first content items is delayed.

The environment 100 may include one or more user devices 102, which may be employed by one or more users to view or otherwise access information on a page such as a web page. The user device(s) 102 may comprise any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, and so forth. An example of the user device(s) 102 is described further with reference to FIG. 9.

The user device(s) 102 may execute a browser module 104. The browser module 104 may be any type of web browser, including but not limited to the following: Mozilla® Firefox®, Microsoft® Internet Explorer®, Google® Chrome®, Apple® Safari®, Rockmelt®, Amazon® Silk®, and so forth. The user device(s) 102 may also execute a user application 106. The user application 106 may include any type of application configured to present content. As shown in the example of FIG. 1, the user application 106 may execute as a web application within the browser module 104. However, implementations are not so limited, and also support any type of user application 106 that executes outside the browser module 104. A user may employ one or both of the browser module 104 or the user application 106 to generate a page request 108 for one or more pages such as a web page. The page request 108 may include an identification of the requested page, such as one or more of a Uniform Resource Identifier (URI), a Uniform Resource Locator (URL), a Uniform Resource Name (URN), an Internet Protocol (IP) address, a file or directory path, and so forth.

The user device(s) 102 may communicate the page request 108 to one or more server device(s) 110. The server device(s) 110 may include any type of computing device, including but not limited to a server computer, personal computer, network computer, cloud computing or distributed computing device, any of the types of computing devices described with reference to the user device(s) 102, or other types of computing devices. An example of the server device(s) 110 is described further with reference to FIG. 8.

In some implementations, the server device(s) 110 may execute a content service module 112. The content service module 112 may receive and analyze the page request 108 sent from the user device(s) 102. In some implementations, the content service module 112 may include software modules configured to process the page requests 108, and the software modules may include modules from a web server, an application server, and so forth. The server device(s) 110 may also execute a content generation/retrieval module 114. In some implementations, as in the example of FIG. 1, the content generation/retrieval module 114 may execute as a sub-module, sub-component, or sub-process of the content service module 112. Alternatively, the content generation/retrieval module 114 may execute separately from the content service module 112.

The content generation/retrieval module 114 may perform operations to dynamically generate content to be served to the user device(s) 102 in response to the page request 108. Alternatively, the content generation/retrieval module 114 may access content storage 116 to retrieve content to be served in response to the page request 108. The content storage 116 may comprise any number of data storage systems that employ any type of data storage technology, including relational databases, non-relational databases, or both relational and non-relational databases. Although the content storage 116 is depicted in FIG. 1 as external to the server device(s) 110, implementations are not so limited. In some implementations, the content storage 116 may be at least partly incorporated into the server device(s) 110 as local storage. The content storage 116 may store one or more pages 118. In some implementations, the content generation/retrieval module 114 may retrieve the page(s) 118 that include content requested in the page request 108. Alternatively, the content storage 116 stores one or more content items that may be retrieved by the content generation/retrieval module 114 and assembled to dynamically generate the page(s) 118 requested by the page request 108. In some implementations, the content generation/retrieval module 114 may dynamically generate the page(s) 118 to be served in response to the page request 108, and cache the dynamically generated pages. The cached pages may then be served in response to subsequent, similar requests for content until the cached version times out.

As described above, the page 118 to be served in response to the page request 108 may specify one or more first content items 120 and one or more second content items 122. In an initial version of the page 118, such as in the version of the page 118 retrieved or generated by the content generation/retrieval module 114, the first content item(s) 120 may be initially designated to be loaded earlier than the second content item(s) 122 during the presentation of the page 118, and the second content item(s) 122 may be initially designated to load after the first content item(s) 120. As described above, in some cases the first content item(s) 120 may include critical content items, and the second content item(s) 122 may include non-critical content items.

In some implementations, the page 118 specified in the page request 108 may be a dynamic web page. A dynamic web page may be, at least in part, generated dynamically on the server device(s) 110 prior to being sent to the request user device(s) 102. In such cases, the promotion of the second content item(s) 122 may include dynamically generating the page 118 such that references to the second content item(s) 122 are included in the page description (e.g., the page source) before references to one or more of the first content items 120. For example, one or more second content items 122 may be promoted such that they are referenced in a resource tag, object tag, or other metadata element that is in the head section of the page 118 instead of in the body section. Alternatively, one or more second content items 122 may be referenced earlier in the body section than they may otherwise be referenced in an absence of promotion. Promoting the second content item(s) 122 to be referenced earlier in the page description than they would otherwise be referenced may enable the promoted second content item(s) 122 to be retrieved and presented on the user device(s) 102 while the first content item(s) 120 are unavailable.

In some implementations, the page 118 specified in the page request 108 may be a substantially static web page that is retrieved and sent to the user device(s) 102 in response to the page request 108. In such cases, the promotion of the second content item(s) 122 may include modifying the source of the page 118 before it is sent to the user device(s) 102. For example, an initial version of the page 118 may include one or more first content items 120 that are referenced, e.g., using object or resource tags, prior to one or more second content items 122 in the source of the page 118. Promotion may include editing the source to move one or more second content items 122 to be referenced prior to one or more of the first content items 120 in the source of the page 118. This may enable the user device(s) 102 to request the promoted second content item(s) 122 prior to the first content item(s) 120, while the first content item(s) 120 are unavailable.

In some implementations, the determination to promote one or more second content items 122 may be made substantially in real time when responding to the page request 108. For example, while processing the page request 108 a determination may be made that the generation or retrieval of one or more first content items 120 is stalled, and that the first content item(s) 120 may therefore be unavailable during the delay 128. In such cases, a dynamic determination may be made to promote one or more second content items 122 to be sent to the user device 102, or to be presented on the user device 102, during the delay 128. Alternatively, the determination to promote one or more second content items 122 may be made, at least in part, prior to receiving the page request 108. For example, such a determination may be made based on historical performance data describing previous delays while the first content item(s) 120 are retrieved or generated for the requested page 118.

Figure 2:
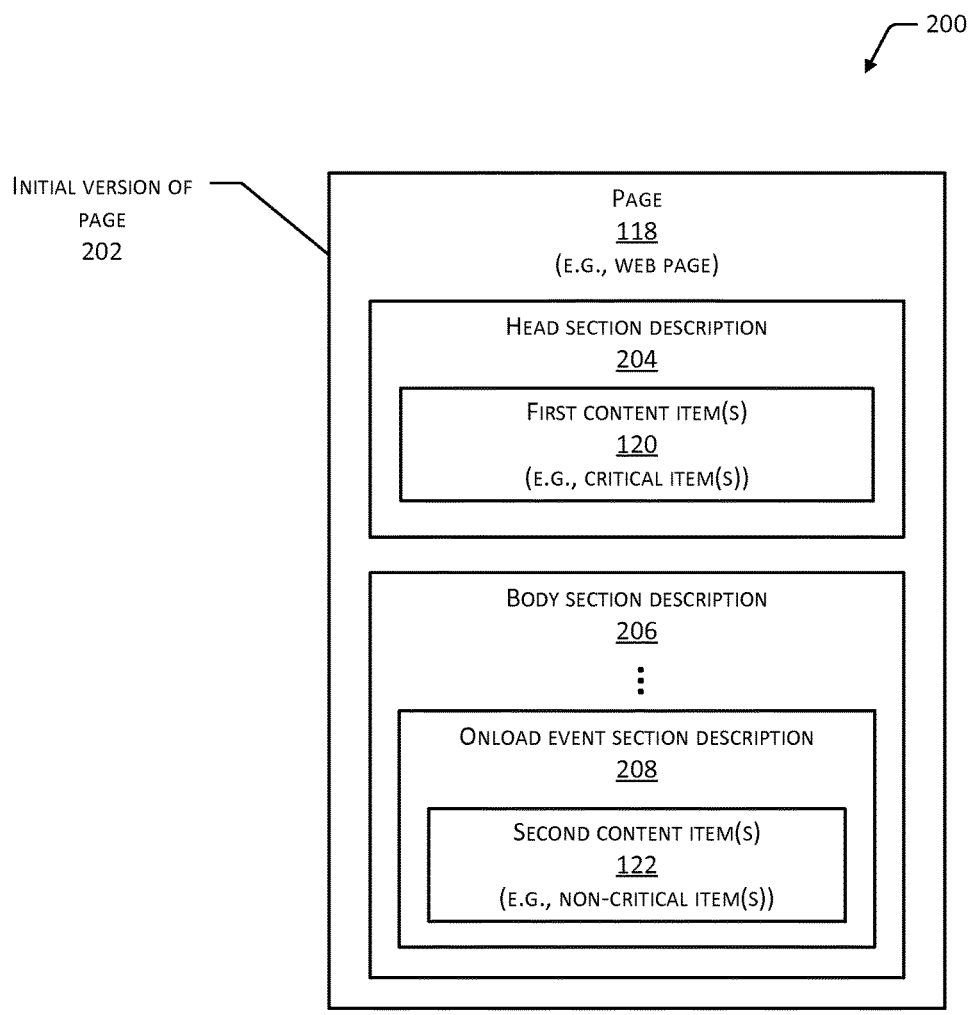
FIG. 2 depicts a schematic illustrating an example of an initial version of a page prior to the promotion of non-critical content items.

FIG. 2 depicts a schematic 200 illustrating an example of an initial version of a page 202 such as may be retrieved or generated by the content generation/retrieval module 114, prior to the promotion of any of the second content item(s) 122. In this example, the page 118 is a web page specified in HTML or another markup language. As such, the page 118 may include a head section description 204 and a body section description 206. The head section description 204 and the body section description 206 may be delineated by HEAD and BODY tags or other metadata included in the specification of the page 118. In the example of FIG. 2, one or more first content items 120 are specified to be loaded in the head section of the page 118, and one or more second content items 122 are specified to be loaded in the body section. When loading a web page specified using HTML, a web browser may load the content included in the head section prior to content included in the body section. Thus, by including the first content item(s) 120 in the head section description 204, an author of the page 118 may specify that the first content item(s) 120 are to be loaded prior to other content that is included in the body section description 206.

In the example of FIG. 2, the second content item(s) 122 are included in an onload event section description 208 that is a subsection of the body section description 206. The onload event section description 208 may include content that is initially specified to be loaded in response to a JavaScript onload event, following the loading of other content in the page 118. Implementations are not limited to the example initial version of the page 202 illustrated in FIG. 2. For example, the initial version of the page 202 may include first content item(s) 120 and second content item(s) 122 specified in the body section description 206, such that the first content item(s) 120 are initially designated to be loaded prior to second content item(s) 122. In general, implementations support the specification of the first content item(s) 120 and the second content item(s) 122 in any section or portion of the DOM that describes the page 118 and at any number of locations in the specification of the page 118.

Returning to FIG. 1, in some implementations the server device(s) 110 may include a content promotion module 124. As shown in the example of FIG. 1, the content promotion module 124 may execute as a sub-module, sub-component, or sub-process of the content service module 112. Alternatively, the content promotion module 124 may execute as a separate module from the content service module 112. The content promotion module 124 may analyze the content specified to be loaded within the page 118 and determine whether promotion of any of the second content item(s) 122 may result in faster page loading. Operations of the content promotion module 124 are described further with reference to FIG. 10.

In some implementations, the server device(s) 110 may execute a delay estimation module 126, which analyzes the page 118 to determine whether there may be a latency, delay, pause, or interruption in retrieving or generating one or more of the first content item(s) 120 that are initially specified to load earlier within the page 118. If so, then the delay estimation module 126 may estimate an amount of time corresponding to a delay 128 in retrieving or generating one or more of the first content item(s) 120. The delay 128 may be estimated as a time period using any unit of measure, such as milliseconds. Operations of the delay estimation module 126 are described further with reference to FIG. 13. Although the delay estimation module 126 is depicted in FIG. 1 as a sub-module, sub-component, or sub-process of the content promotion module 124, in some implementations the delay estimation module 126 may execute separately from the content promotion module 124.

Figure 3:
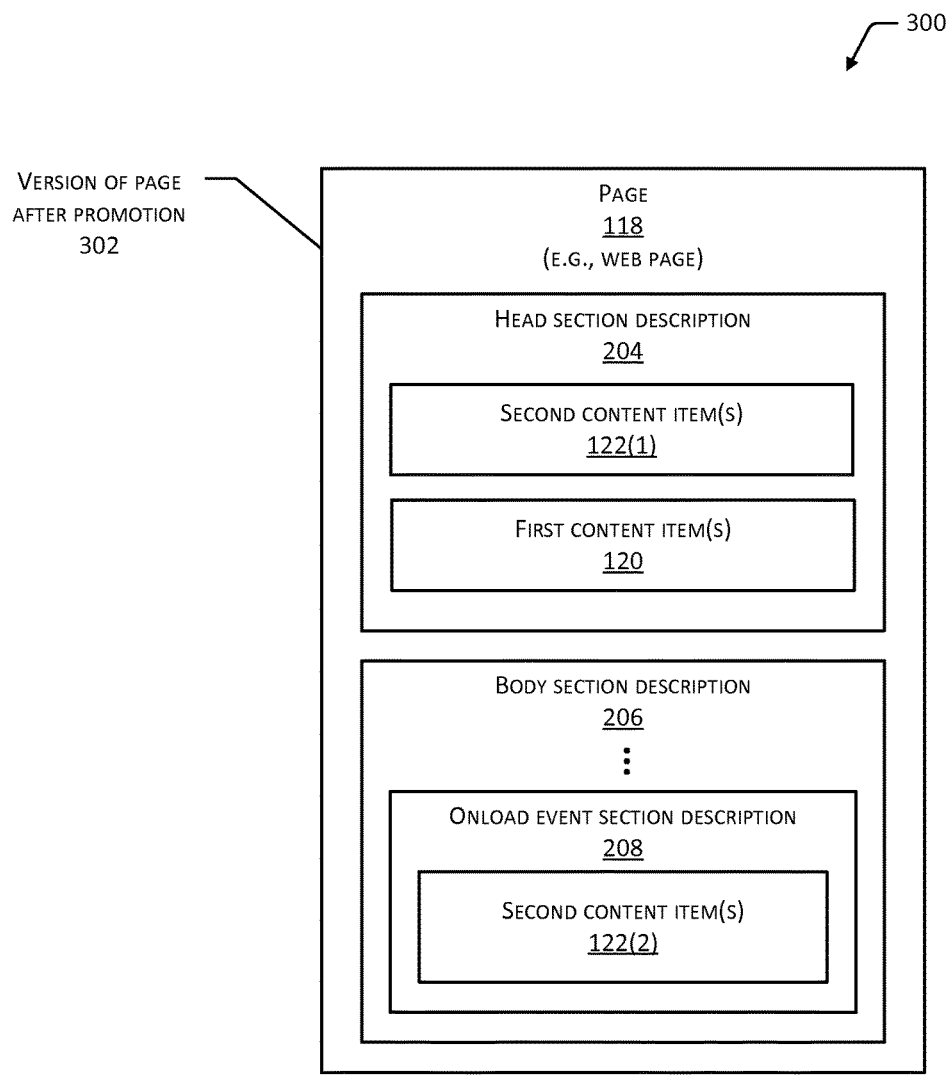
FIG. 3 depicts a schematic illustrating an example of a version of a page after the promotion of one or more non-critical content items.

In some implementations, one or more of the second content item(s) 122 may be promoted to load prior to the first content item(s) 120 when the page 118 is being presented on the user device(s) 102. Such promotion may generate an updated version of the page 118. FIG. 3 depicts a schematic 300 illustrating an example of a version of the page after promotion 302. This example illustrates the page 118 as shown in FIG. 2, modified by the promotion of one or more of the second content items 122. As shown in FIG. 3, one or more of the second content items 122 that are initially designated to be loaded in response to an onload event have been promoted to load within the head section. Accordingly, following the promotion operations one or more second content item(s) 122(1) are specified in the head section description 204, and one or more other second content item(s) 122(2) remain specified in the onload event section description 208.

In some implementations, the promotion operations may generate an updated version of the page 118 by modifying the source of the page 118. Alternatively, instead of modifying the source the promotion operations may specify that certain content items be delivered to the user device 102 or loaded on the user device 102 in a different order than initially specified in the initial version of the page 118.

Returning to FIG. 1, following the promotion operations the first content item(s) 120 and the second content item(s) 122 may be sent to the user device(s) 102. Based on the promotion operations, the second content item(s) 122 may be sent such that they may be loaded and presented on the user device(s) 102 during the delay 128 when the first content item(s) 120 are being retrieved or generated. Accordingly, implementations may provide for faster page loads by utilizing the delay 128 to load content that may be otherwise stalled waiting for the retrieval or generation of the first content item(s) 120.

Figure 4:
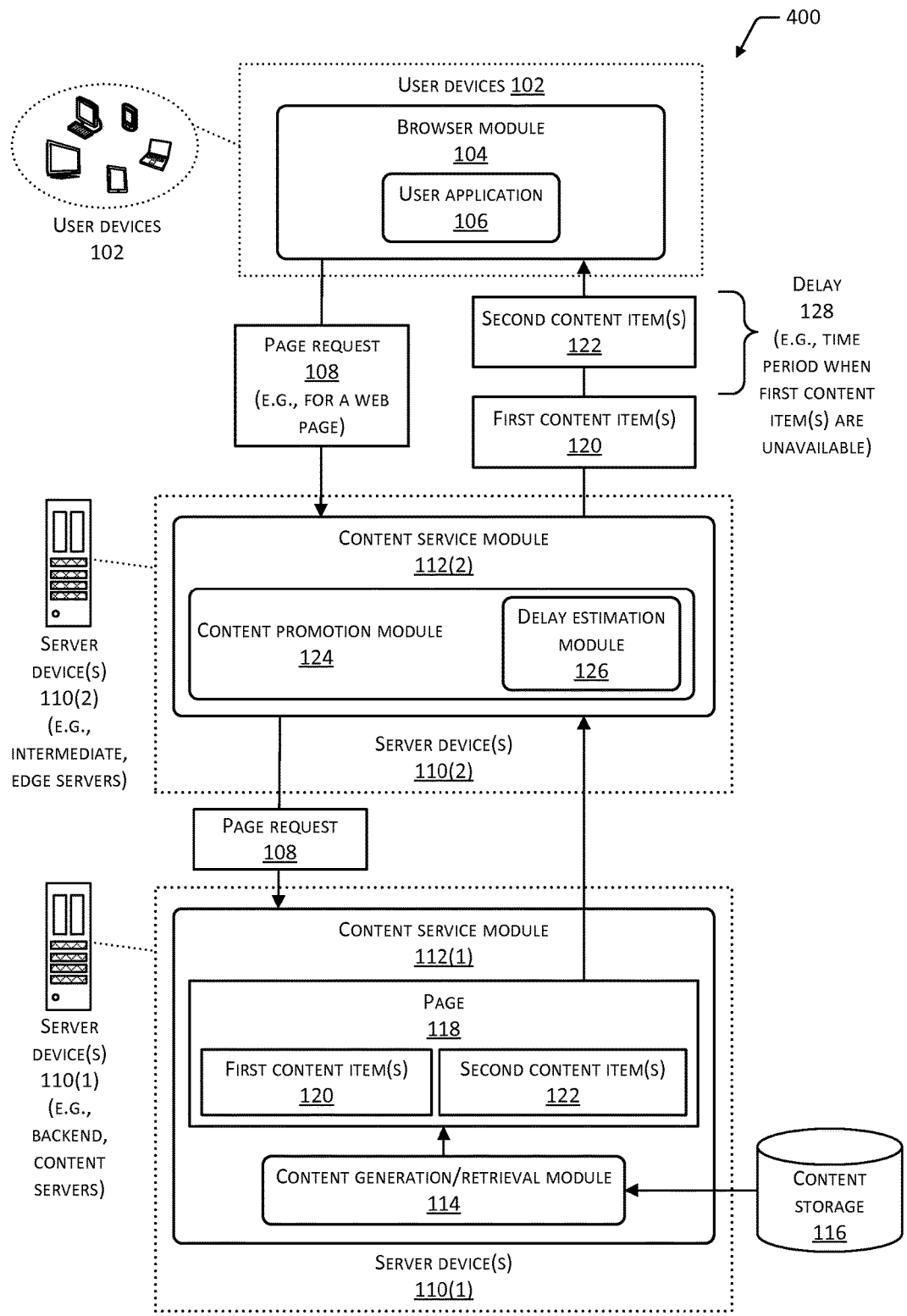
FIG. 4 depicts an environment for delivering content included in a page, the environment including an edge server device or other type of intermediate server device that performs operations to promote non-critical content items to load prior to critical content items when the availability of the critical content items is delayed.

FIG. 4 depicts an environment 400 for delivering content included in the page 118 requested in the page request 108. FIG. 4 depicts implementations in which the environment 400 includes one or more server devices 110(1) that may be separate from one or more server devices 110(2). In the example of FIG. 4, the server device(s) 110(1) may include backend server devices or content server devices, and the server device(s) 110(2) may include edge server device(s), mid-tier server device(s), or other types of intermediate server device(s). The server device(s) 110(2) may operate inside or outside a firewall that protects the server device(s) 110(1).

As described above with reference to FIG. 1, the user device(s) 102 may generate the page request 108, which is sent to the server device(s) 110(2). The server device(s) 110(2) may execute a content service module 112(2), which receives the page request 108. Based on the page request 108, the content service module 112(2) may determine one or more server devices 110(1) based on their suitability to provide content to satisfy the page request 108. The content service module 112(2) may forward the page request 108 to the content service module 112(1) executing on the determined server device(s) 110(1). As described above, the server device(s) 110(1) may execute the content generation/retrieval module 114, which may perform operations to generate or retrieve the initial version of the page 118. The page 118 may then be sent to the content service module 112(2) executing on the server device(s) 110(2).

In some cases, the server device(s) 110(2) may cache one or more pages 118 previously retrieved or generated in response to one or more page requests 108. In cases where there is a cached version of the page 118 on the server device(s) 110(2), and where the cached version is more recent than a predetermined threshold age, the content service module 112(2) may retrieve the cached version of the page 118 instead of requesting a new version of the page 118 from the server device(s) 110(1).

In implementations illustrated by FIG. 4, the server device(s) 110(2) may execute the content promotion module 124 and the delay estimation module 126 to determine whether any of the second content item(s) 122 included in the page 118 may be promoted to enable faster loading of the page 118. Such operations may proceed as described above, and as further described below with reference to FIGS. 10 and 13. Following the promotion operations performed on the server device(s) 110(2), the first content item(s) 120 and the second content item(s) 122 may be sent to the user device(s) 102. As described herein, the second content item(s) 122 may be sent such that they may be loaded and presented on the user device(s) 102 during the delay 128 when the first content item(s) 120 are being retrieved or generated.

Figure 5:
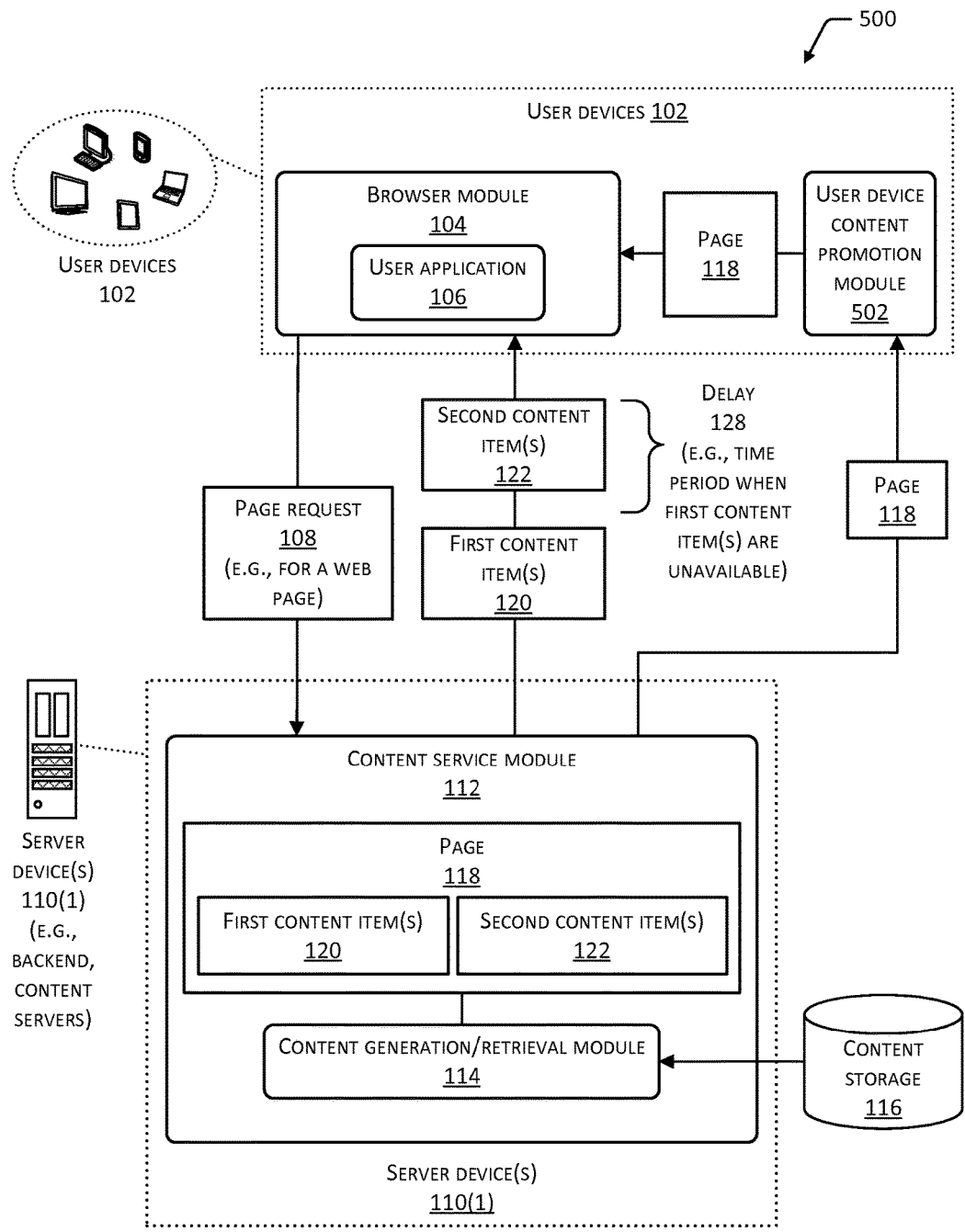
FIG. 5 depicts an environment for delivering content included in a page, the environment including a user device that performs operations to promote non-critical content items to load prior to critical content items when the availability of the critical content items is delayed.

FIG. 5 depicts an environment 500 for delivering content included in the page 118 requested in the page request 108. FIG. 5 depicts implementations in which promotion operations may be performed by processes executing on the user device(s) 102 instead of, or in addition to, processes executing on any of the server device(s) 110.

As described above, the user device(s) 102 may generate the page request 108 that is sent to the server device(s) 110(1), and the server device(s) 110(1) may retrieve or generate a specification for the requested page 118 which is then sent back to the user device(s) 102. Alternatively, in some implementations the page request 108 may be sent to an intermediate server device such as the server device(s) 110(2) described with reference to FIG. 5, and the server device(s) 110(2) may send the specification for the page 118 to the user device(s) 102.

Figure 11:
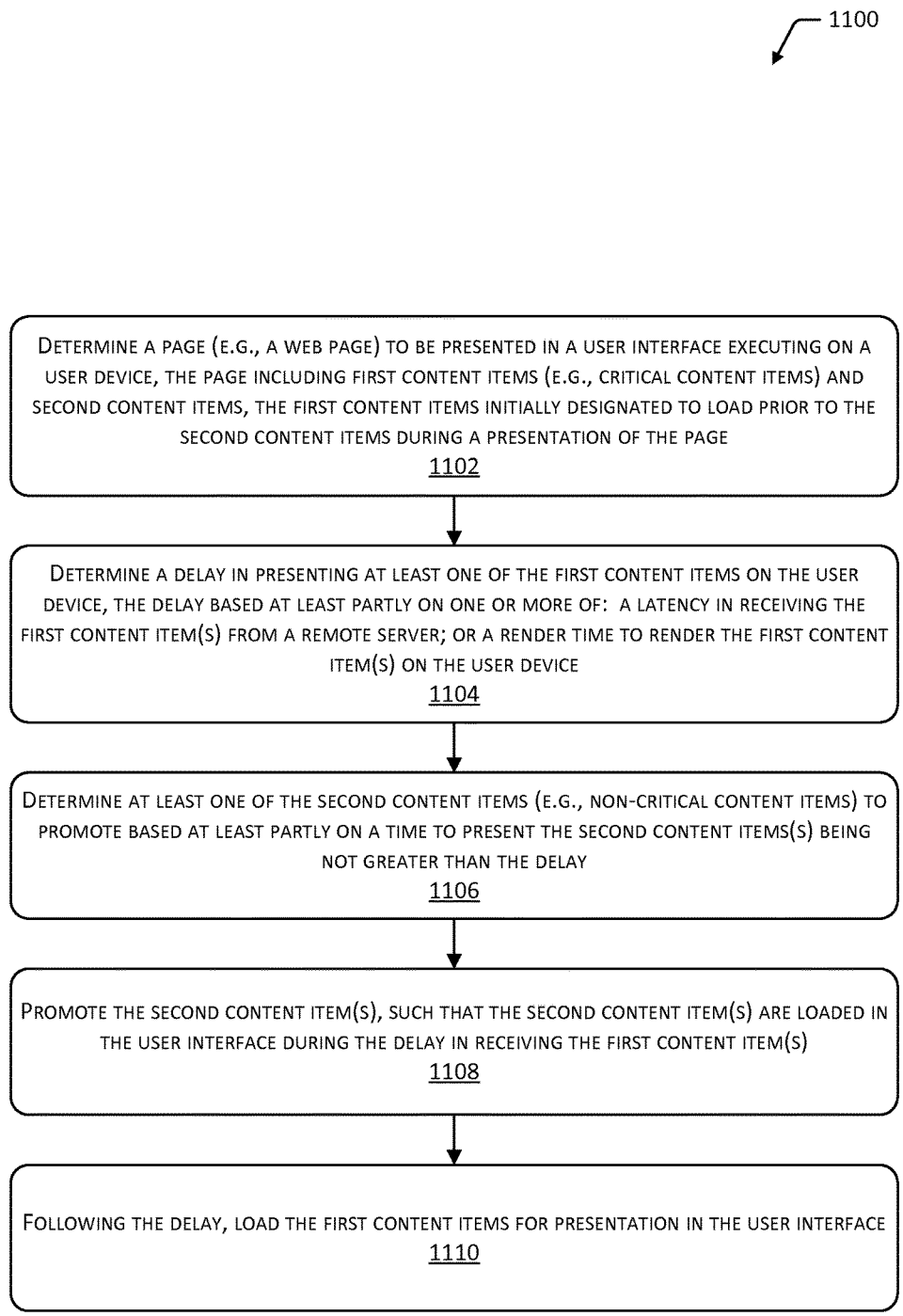
FIG. 11 depicts a flow diagram of a process that may be performed on a user device, the process including operations for promoting non-critical content items to load prior to critical content items when the availability of the critical content items is delayed.

In implementations illustrated by FIG. 5, the user device(s) 102 may execute a user device content promotion module 502, the operations of which are described further with reference to FIG. 11. The user device content promotion module 502 may perform operations to determine whether any of the second content item(s) 122 specified in the page 118 may be promoted to enable faster loading of the page 118 on the user device(s) 102. If so, then promotion operations may be performed to specify that one or more of the second content item(s) 122 be loaded prior to the first content item(s) 120, during the delay 128 while the first content item(s) 120 are unavailable. Although not shown in FIG. 5, the user device(s) 102 may execute a delay estimation module to estimate the delay 128 by performing operations similar to those of the delay estimation module 126. The user device content promotion module 502 may generate a modified version of the page 118 in which one or more second content items 122 are promoted to be loaded and presented prior to one or more first content items 120, during the delay 128 when the first content item(s) 120 may be available. The user device content promotion module 502 may then provide the modified version of the page 118 to the browser module 104, which may then request the promoted second content item(s) 122 prior to the first content item(s) 120 as shown in the example of FIG. 5.

In some implementations, the user device(s) 102 may receive the first content item(s) 120 and the second content item(s) 122 from a same server device 110, as shown in FIG. 5. Alternatively, the user device(s) 102 may receive two or more of the first content item(s) 120 and the second content item(s) 122 from different server devices 110, e.g., in configurations where various content items are served by different ones of the server devices 110.

Figure 6:
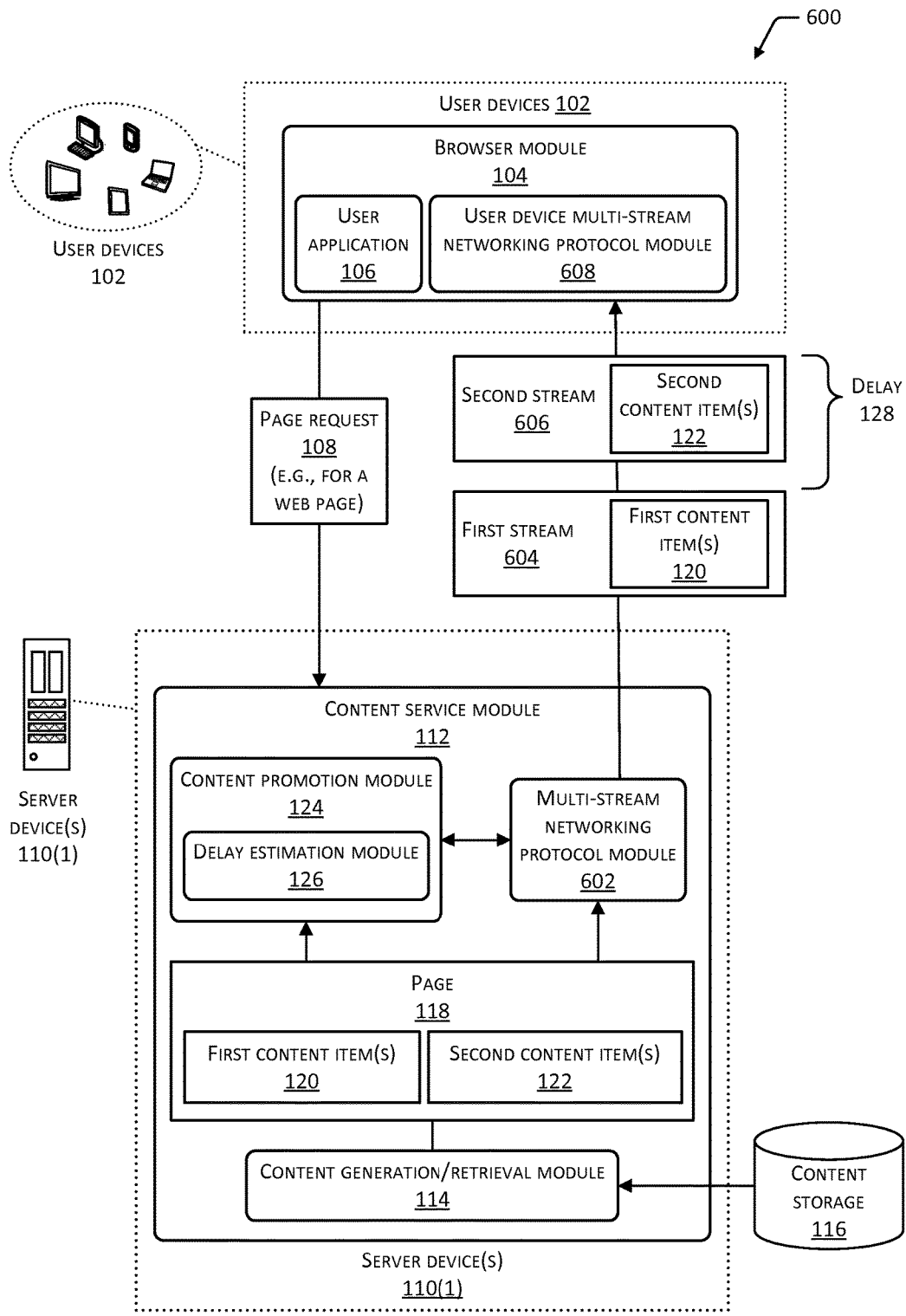
FIG. 6 depicts an environment for delivering content included in a page, the environment including a server device that performs operations to promote non-critical content items to load prior to critical content items when the availability of the critical content items is delayed, wherein the server device employs a multi-stream networking protocol to deliver the content to a user device.

FIG. 6 depicts an environment 600 for delivering content included in the page 118 requested in the page request 108. In implementations illustrated by FIG. 6, the server device(s) 110(1) (e.g., backend or content server devices) may employ a multi-stream networking protocol to communicate the requested content to the user device(s) 102. Utilizing such a protocol, a plurality of content delivery streams may be multiplexed to deliver information more efficiently over a single connection to the user device(s) 102. In some implementations the multi-stream networking protocol may be any version of SPDY™.

As described above, the user device(s) 102 may generate the page request 108 which is sent to the server device(s) 110(1). The server device(s) 110(1) may execute the content generation/retrieval module 114 which may generate or retrieve a specification for the requested page 118. The content promotion module 124, the delay estimation module 126, or both may perform operations to determine whether one or more of the second content item(s) 122 specified in the page 118 may be promoted to enable faster loading of the page 118 on the user device(s) 102. Alternatively, in some implementations the page request 108 may be sent to an intermediate server device such as the server device(s) 110(2) described with reference to FIG. 5, and the server device(s) 110(2) may send the specification for the page 118 to the user device(s) 102 after performing promotion operations.

The server device(s) 110(1) may execute a multi-stream networking protocol module 602, which may mediate or control the communication of information over a multi-stream networking protocol. Although FIG. 6 depicts the multi-stream networking protocol module 602 as a sub-module, sub-component, or sub-process of the content service module 112, in some implementations the multi-stream networking protocol module 602 may execute as a separate module from the content service module 112. As shown in FIG. 6, the multi-stream networking protocol module 602 may communicate with the content promotion module 124, and receive information regarding which, if any, of the second content item(s) 122 are to be promoted. The multi-stream networking protocol module 602 may then implement such promotion by prioritizing the writing of various content items to various streams included in a plurality of streams supported by the multi-stream networking protocol. For example, the multi-stream networking protocol module 602 may designate a first stream 604 in which to communicate the first content item(s) 120, and may designate a second stream 606 in which to communicate the second content item(s) 122.

Although not shown in FIG. 6, in some implementations the remainder of the requested page 118, including content other than the first content item(s) 120 and the promoted second content item(s) 122, may be delivered to the user device(s) 102 in the first stream 604. In some cases, such remaining content may include one or more unpromoted second content items 122.

Figure 7:
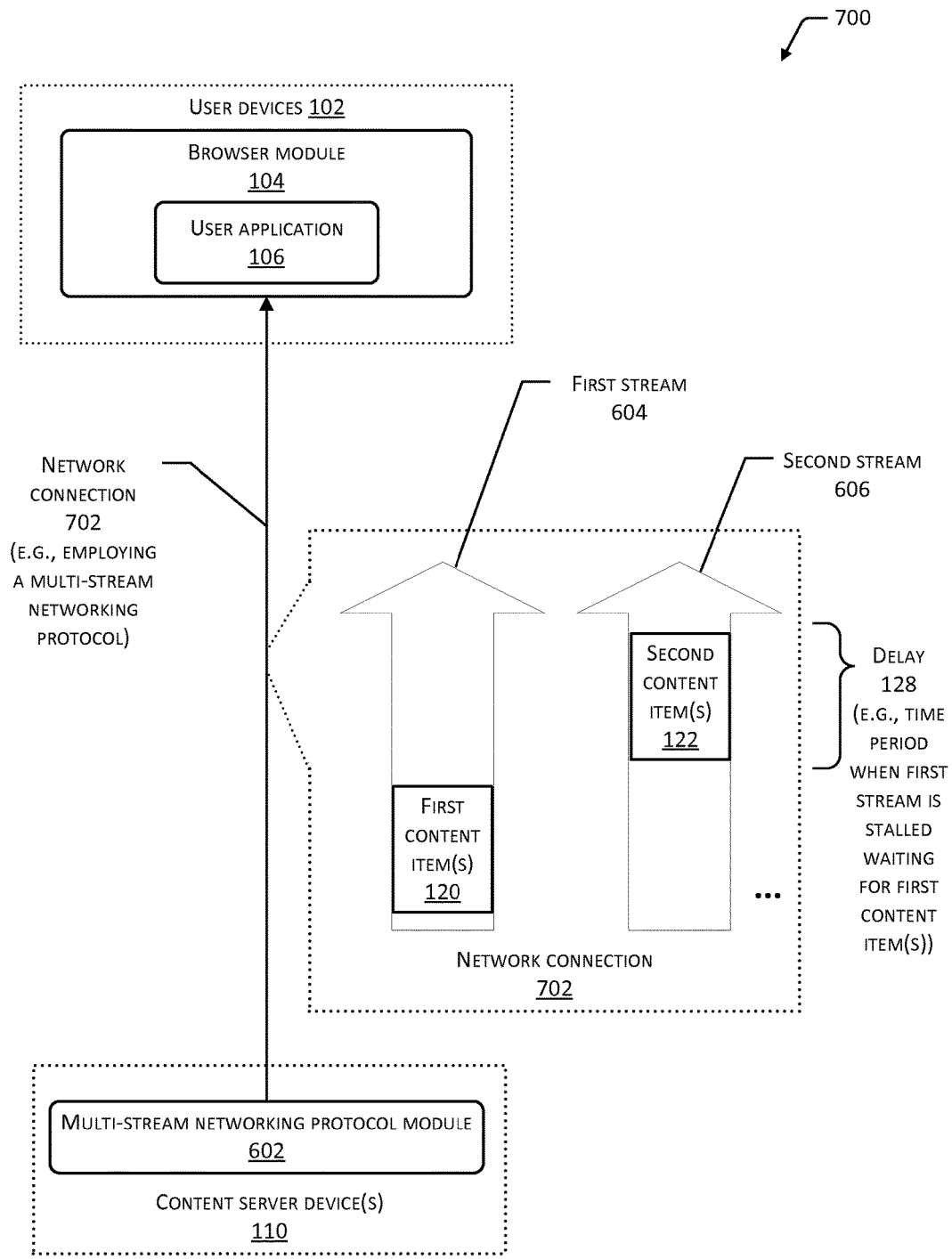
FIG. 7 depicts a schematic illustrating the use of a multi-stream networking protocol to deliver content, wherein non-critical content items may be promoted to load prior to critical content items by writing the non-critical content items to a particular stream.

FIG. 7 depicts a schematic 700 illustrating the use of the multi-stream networking protocol to deliver content. In the example illustrated, the multi-stream networking protocol multiplexes a plurality of streams over a single network connection 702 to enable faster, more efficient communication of information to the user device(s) 102. Alternatively, implementations also support a multi-stream networking protocol that supports a plurality of streams sent over a plurality of network connections. During the delay 128 while the first content item(s) 120 may be unavailable, the multi-stream networking protocol module 602 may write the second content item(s) 122 to the second stream 606 in preference to writing information to the first stream 604. In this way, multi-stream networking protocol module 602 may enable the promotion and prior delivery of one or more of the second content item(s) 122 over the first content item(s) 120 by preferentially writing information to the second stream 606 associated with the second content item(s) 122 during the delay 128.

Returning to FIG. 6, in some implementations the user device(s) 102 may execute a user device multi-stream networking protocol module 608. Although the user device multi-stream networking protocol module 608 is depicted in FIG. 6 as a sub-module, sub-component, or sub-process of the browser module 104, in some implementations the user device multi-stream networking protocol module 608 may execute separately from the browser module 104. The user device multi-stream networking protocol module 608 may perform operations to receive and process the information communicated by the plurality of streams of the multi-stream networking protocol, and may communicate the contents of the page 118 for presentation by one or both of the browser module 104 and the user application 106.

Implementations may employ any of the example environments depicted in FIGS. 1 and 4-6, alone or in any combination. Implementations support content promotion operations performed on any device or in any stage of the content delivery process. The content promotion operations may be performed on the user device(s) 102 by the user application 106, the browser module 104, or another module of the user device(s) 102. The content promotion operations may be performed by module(s) executing on any of the server device(s) 110, including but not limited to a backend server, a primary server, a content server, a mid-tier server, an intermediate server, an edge server, or on any other device. Moreover, promotion operations may be performed incrementally by multiple devices. For example, one of the server device(s) 110 may promote one or more second content items 122, and the user device(s) 102 may promote one or more different second content items 122. Additionally, the multi-stream networking protocol content delivery mechanism described with reference to FIG. 6 may be employed at least in part in any of the other system configurations described with reference to FIGS. 1, 4, and 5.

The various devices of the environments 100, 400, 500, and 600 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environments 100, 400, 500, and 600 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 8:
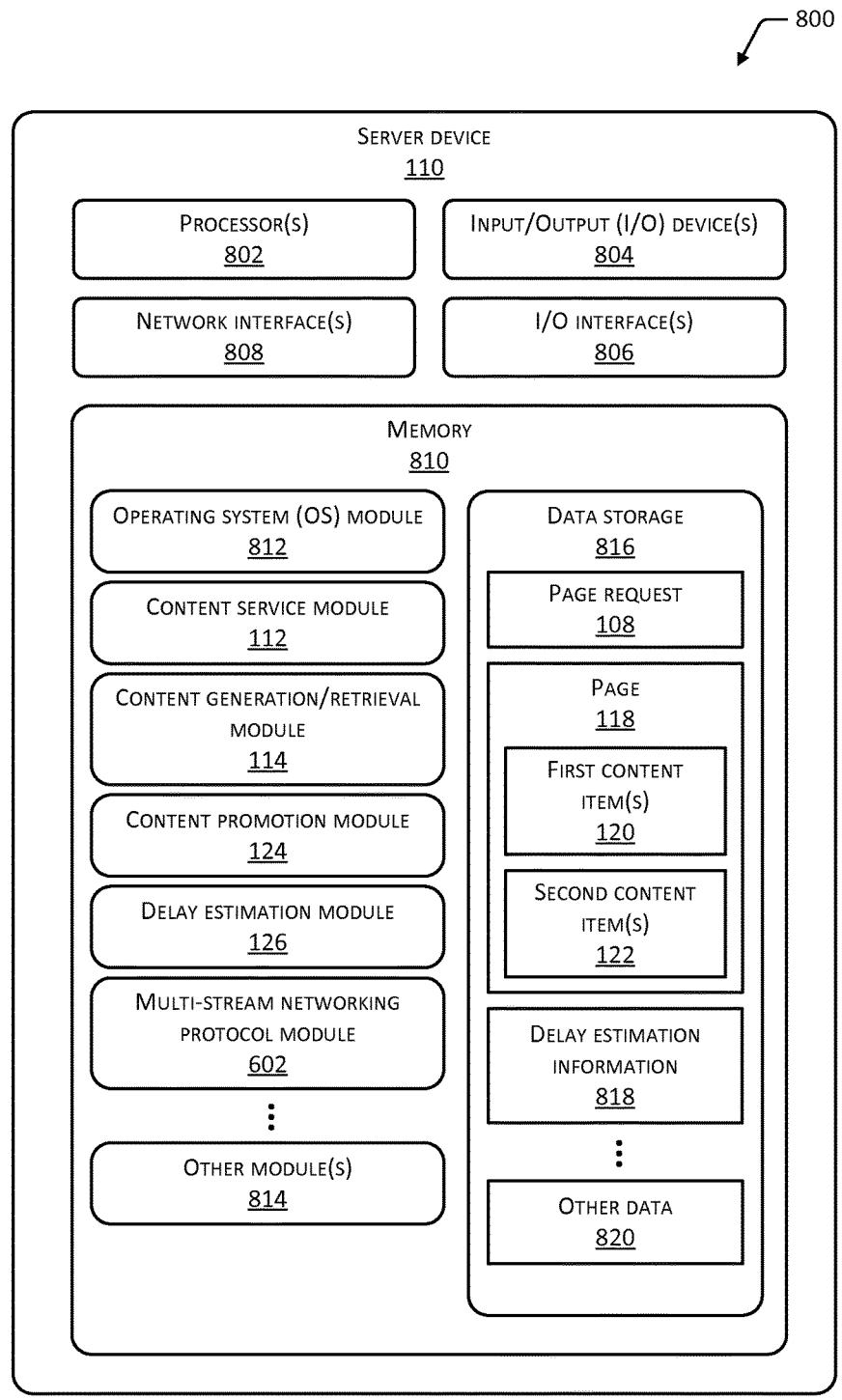
FIG. 8 depicts a block diagram of an example server device configured to perform operations to promote non-critical content items to load prior to critical content items when the availability of the critical content items is delayed.

FIG. 8 depicts a block diagram 800 of an example of the server device(s) 110. As shown in the block diagram 800, the server device 110 may include one or more processors 802 configured to execute one or more stored instructions. The processor(s) 802 may comprise one or more cores.

The server device 110 may include one or more input/output (I/O) devices 804. The I/O device(s) 804 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 804 may also include output devices such as a display, an audio output device (e.g., a speaker), a printer, a haptic output device, and so forth. The I/O device(s) 804 may be physically incorporated with the server device 110, or may be externally placed.

The server device 110 may include one or more I/O interfaces 806 to enable components or modules of the server device 110 to control, interface with, or otherwise communicate with the I/O device(s) 804. The I/O interface(s) 806 may enable information to be transferred in or out of the server device 110, or between components of the server device 110, through serial communication, parallel communication, or other types of communication. For example, the I/O interface(s) 806 may comply with a version of the RS-232 standard for serial ports, or with a version of the Institute of Electrical and Electronics Engineers (IEEE) 1284 standard for parallel ports. As another example, the I/O interface(s) 806 may be configured to provide a connection over Universal Serial Bus (USB) or Ethernet. In some cases, the I/O interface(s) 806 may be configured to provide a serial connection that is compliant with a version of the IEEE 1394 standard. The server device 110 may also include one or more busses or other internal communications hardware or software that allow for the transfer of data between the various modules and components of the server device 110.

The server device 110 may include one or more network interfaces 808 that enable communications between the server device 110 and other networked devices, such as other server device(s) 110, the user device(s) 102, or the content storage 116. The network interface(s) 808 may include one or more network interface controllers (NICs) or other types of transceiver devices configured to send and receive communications over a network.

The server device 110 may include one or more memories, described herein as memory 810. The memory 810 comprises one or more computer-readable storage media (CRSM). The CRSM may include one or more of an electronic storage medium, a magnetic storage medium, an optical storage medium, a quantum storage medium, a mechanical computer storage medium, and so forth. The memory 810 provides storage of computer-readable instructions that may describe data structures, program modules, processes, or applications, and other data for the operation of the server device 110.

The memory 810 may include an operating system (OS) module 812. The OS module 812 may be configured to manage hardware resources such as the I/O device(s) 804, the I/O interface(s) 806, and the network interface(s) 808, and to provide various services to applications, processes, or modules executing on the processor(s) 802. The OS module 812 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 810 may include one or more of the modules described above as executing on the server device(s) 110, such as one or more of the content service modules 112, the content generation/retrieval module 114, the content promotion module 124, the delay estimation module 126, or the multi-stream networking protocol module 602. The memory 810 may also include one or more other modules 814, such as a user authentication module or an access control module to secure access to the server device 110, and so forth.

The memory 810 may include data storage 816 to store data for operations of the server device 110. The data storage 816 may comprise a database, array, structured list, tree, or other data structure, and may be a relational or a non-relational datastore. The data storage 816 may store one or more of the page request 108 or the page 118, including the first content item(s) 120 and the second content item(s) 122. In some implementations, the data storage 816 may also store delay estimation information 818 that may be employed by the delay estimation module 126 to estimate the delay 128 in presenting the first content item(s) 120 on the user device(s) 102. The delay estimation information 818 may include one or more of the following: historical timing information describing an amount of time taken to previously generate or retrieve the first content item(s) 120; computing capabilities, processing speed, network capabilities, or other characteristics of one or more server devices 110 that generate or retrieve the first content item(s) 120; characteristics of a network available to communicate the first content item(s) 120 to the user device(s) 102, such as bandwidth, latency, speed, and so forth; computing capabilities, processing speed, or network capabilities, or other characteristics of the user device(s) 102 to receive and present the first content item(s); or information describing characteristics of the first content item(s) 120, such as file size, file type, format, and so forth.

The data storage 816 may also store other data 820, such as user authentication information or access control data. In some implementations, at least a portion of the information stored in the data storage 816 may be stored externally to the server device 110, on other devices that are accessible to the server device 110 via the I/O interface(s) 806 or via the network interface(s) 808.

Figure 9:
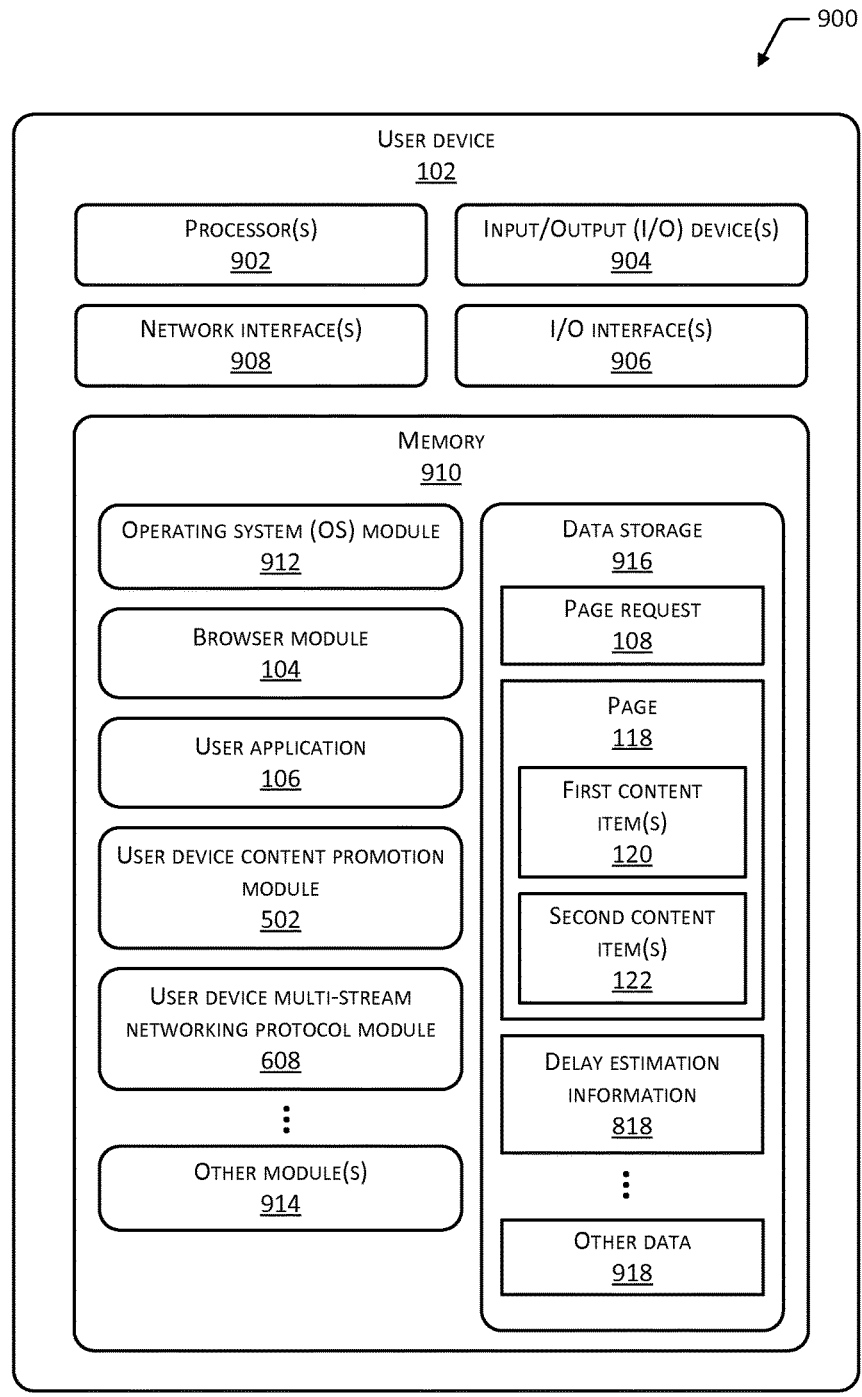
FIG. 9 depicts a block diagram of an example user device configured to present content, and further configured to perform operations to promote non-critical content items to load prior to critical content items when the availability of the critical content items is delayed.

FIG. 9 depicts a block diagram 900 of an example of the user device(s) 102. As shown in the block diagram 900, the user device 102 may include one or more processors 902 configured to execute one or more stored instructions. The processor(s) 902 may comprise one or more cores. The user device 102 may include one or more I/O devices 904, one or more I/O interfaces 906, and one or more network interfaces 908 as described above with reference to the I/O device(s) 804, the I/O interface(s) 806, and the network interface(s) 808 respectively.

The user device 102 may include one or more memories, described herein as memory 910. The memory 910 comprises one or more CRSM. The CRSM may include one or more of an electronic storage medium, a magnetic storage medium, an optical storage medium, a quantum storage medium, a mechanical computer storage medium, and so forth. The memory 910 provides storage of computer-readable instructions, data structures, program modules, and other data for the operation of the user device 102. The memory 910 may include an OS module 912. The OS module 912 may be configured to manage hardware resources such as the I/O device(s) 904, the I/O interface(s) 906, and the network interface(s) 908, and to provide various services to applications, processes, or modules executing on the processor(s) 902. The OS module 912 may include one or more of the operating systems described above with reference to OS module 812.

The memory 910 may include any of the modules described above as executing on the user device(s) 102, such as the browser module 104, the user application 106, the user device content promotion module 502, or the user device multi-stream networking protocol module 608. The memory 910 may also include one or more other modules 914, such as a user authentication module or an access control module to secure access to the user device 102, and so forth.

The memory 910 may include data storage 916 to store data for operations of the user device 102. The data storage 916 may comprise a database, array, structured list, tree, or other data structure, and may be a relational or a non-relational datastore. The data storage 916 may store the page request 108. The data storage 916 may store the page 118, including the first content item(s) 120 and the second content item(s) 122. In some implementations, the data storage 916 may store the delay estimation information 818 that may be employed by the user device content promotion module 502 to determine whether any of the second content item(s) 122 are to be promoted. The data storage 916 may also store other data 918, such as user authentication information or access control data. In some implementations, at least a portion of the information stored in the data storage 916 may be stored externally to the user device 102, on other devices that are accessible to the user device 102 via the I/O interface(s) 906 or via the network interface(s) 908.

Figure 10:
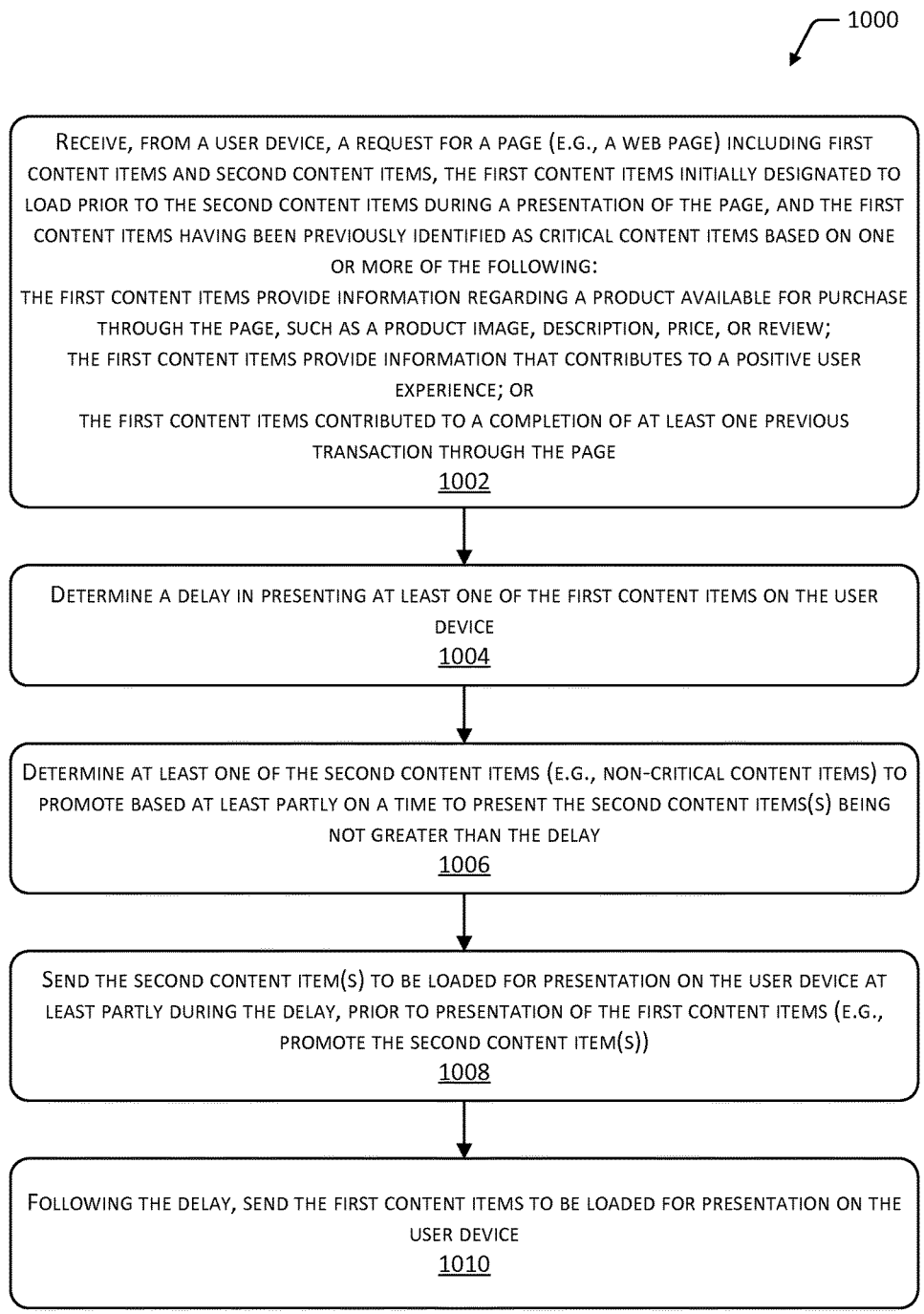
FIG. 10 depicts a flow diagram of a process that may be performed on a server device, the process including operations for promoting non-critical content items to load prior to critical content items when the availability of the critical content items is delayed.

FIG. 10 depicts a flow diagram 1000 of a process for promoting one or more second content items 122 to load prior to the first content items 120 when the availability of the first content items 120 is delayed. The process may be performed on any of the server device(s) 110, such as a backend server, a primary server, a secondary server, a content server, an intermediate server, an edge server, a cloud computing server, and so forth. In some implementations, the process may be performed by the content promotion module 124, one or more of the content service modules 112, other modules of a server device 110, or elsewhere.

At 1002, the page request 108 is received from the user device(s) 102, requesting delivery of content included in the page 118. As described herein, the requested page 118 may specify the first content item(s) 120 and the second content item(s) 122, the first content item(s) 120 being initially designated to load prior to the second content item(s) 122 during presentation of the page 118. In some implementations, the first content item(s) 120 may have been previously identified as critical content items based on a determination that the first content item(s) 120 provide information regarding a product available for purchase through the page 118, such as a product image, description, price, availability, user or expert review, and so forth. In some implementations, the first content item(s) 120 may have been previously identified as critical content items based on a determination that the first content item(s) 120 provide information that contributes to a positive user experience. Such a determination may be based on clickstream data or other data describing user behavior on the page 118. The determination may also be based on usability testing, customer satisfaction survey information, and so forth. In some cases, the first content item(s) 120 may have been previously identified as critical content items based on a determination that the first content item(s) 120 contributed to the completion of at least one previous transaction through the page 118. Such a determination may be based on historical data describing previous transactions, clickstream data describing the browsing or navigation behavior of users, and so forth.

At 1004, the delay 128 may be estimated or otherwise determined. The delay 128 may be a time period during which is it predicted that the first content item(s) 120 may be unavailable, such as while the first content item(s) 120 are being generated or retrieved from storage. Accordingly, in the absence of promotion the loading of the page 118 may be stalled while waiting for the first content items 120. Determination of the delay 128 is described further with reference to FIG. 13.

At 1006, at least one of the second content items 122 may be designated to be promoted to load earlier during the loading of the page 118 than initially designated. In some implementations, the determination of the second content item(s) 122 to promote may be based on a determination that the time to load the promoted second content item(s) 122 is not greater than the delay 128. In some implementations, to avoid any further delay in loading the first content item(s) 120, the second content item(s) 122 chosen for promotion may include the second content item(s) 122 for which loading may be completed within the span of the delay 128. The time to load and present the second content item(s) 122 may be estimated based on one or more of the following: a file size and file type of the second content item(s) 122; the network capacity available to communicate the second content item(s) 122 to the user device(s) 102; the processing capabilities, speed, or other characteristics of the server device(s) 110 that serve the second content item(s) 122; or the processing capabilities, speed, or other characteristics of the user device(s) 102 on which the second content item(s) 122 are to be presented.

In some implementations, the determination of which of the second content item(s) 122 to promote may be further based on an analysis of user behavior or the previous navigation that brought the user to the page 118. For example, if the user is browsing a page that describes a product offered for sale through an e-commerce web site, and the user reached the page from search results generated by an external search engine, an inference may be made that the user is interested in examining a particular product and making a substantially immediate choice whether to buy the product. In such cases, implementations may determine to promote content items that may help the user make such a decision, such as content items that implement shopping cart or purchase functionality. As another example, if the user reached the page after browsing other pages for products within the e-commerce web site, an inference may be made that the user is more casually browsing a general class or type of products within one or more categories. In such cases, implementations may determine to promote content items that aid the user in his or her browsing, such as content items associated with category or brand information, or product options for color, size, quantity, and so forth.

Moreover, in some implementations, the determination of which of the second content item(s) 122 to promote may be based on an analysis of user characteristics such as age, gender, demographic data, location, language information, and so forth. For example, if it is determined that previous promotions of particular second content item(s) 122 led to purchases by users with similar characteristics to those of a current user, those particular second content item(s) 122 may also be promoted to generate the page 118 that is presented to the current user.

In some implementations, the determination of which of the second content item(s) 122 to promote may be based on a prediction of the user's behavior on the page 118, such as whether the user is likely to scroll down the page 118. For example, based on the user's previous behavior or the behavior of similar users, a prediction may be made that the user is likely to scroll down the page 118 to read a first listed review of a product, or multiple reviews. The page 118 may include JavaScript to support the reading and rating of reviews on a product page, and such JavaScript may normally be loaded following an onload event. Based on the determination that the user is likely to scroll down to read at least one review, the JavaScript content items supporting the reviews may be promoted to facilitate the user's activity. Moreover, one or more additional second content items 122 may be promoted to support the activity, such as mouse-over content that provides information regarding the reviewer's identity, rating, and so forth, or other background functionality related to review features on the page 118.

As another example, the page 118 may provide functionality that enables zooming, scrolling, or rotating of an image, or the playing of video content in response to pop-over events, mouse-over events, clicks, and so forth. In an initial version of the page 118, the content items (e.g., JavaScript) providing such functionality may not be loaded until the user performs the events. For example, the content items for a feature enabling an image zoom in response to a click event may not be loaded until the click event. In cases where the user's past behavior shows a tendency to click on an image to zoom, the second content item(s) 122 enabling the zoom feature may be promoted to provide that functionality earlier in the page load process, enhancing the user experience.

Alternatively, in some implementations the candidates for promotion among the second content item(s) 122 may include those content items that are designated to load in a steady state of the page, e.g., the content items that may be loaded in the absence of any user inputs beyond the user's initial request for the page 118.

At 1008, the second content item(s) 122 designated for promotion at 1006 may be sent to the user device(s) 102. As described herein, the second content item(s) 122 may be loaded for presentation on the user device(s) 102 at least partly during the delay 128 while the first content item(s) 120 are unavailable. In some cases, the loading of the second content item(s) 122 may begin during the delay 128 and complete following the delay 128. At 1010, following the delay 128, the first content items 120 may be sent to the user device(s) 102, to be loaded for presentation on the user device(s) 102. Moreover, in some cases any unpromoted second content item(s) 122 may also be sent at 1010, along with any other content of the page 118.

In some implementations, the specification of one or more of the second content item(s) 122 in the description of the page 118 may also be modified such that the second content item(s) 122 are included inline in the source of the page 118 instead of incorporated by reference. The inlining the second content item(s) 122 may include modifying the source of the page 118 to include all or a portion of the code for second content item(s) 122 that are JavaScript files or CSS files. In some cases, the inlining may enable the promoted second content item(s) 122 to load faster, given that the user device(s) 102 may avoid an additional network operation to retrieve the code for referenced second content item(s) 122. The decision to modify the specification of the second content item(s) 122 in the source for the page 118 may be based at least in part on the user's navigation history in reaching the page 118. For example, if the user has reached the page 118 from another page that is internal to the same web site, an assumption may be made that the code for the second content item(s) 122 (e.g., JavaScript and CSS files) may already be cached in memory on the user device(s) 102 or the server device(s) 110(2) (e.g., an edge server). In such cases, implementations may opt not to inline the second content items(s) 122, given that the code for such items may already be readily available in cache. Alternatively, if the user has reached the page 118 from an external web site, an assumption may be made that the code for the second content item(s) 122 may not be present in a cache or that the cache may be cold. In such cases, implementations may opt to inline the code for the second content item(s) 122 to enable the second content item(s) 122 to load faster. Additionally, in such cases implementations may also leave a reference to the second content item(s) 122 in their original location in the source for the page 118, such as in the onload event section description 208. Leaving the reference at onload may ensure that the code for the second content item(s) 122 is cached in preparation for a subsequent request.

FIG. 11 depicts a flow diagram 1100 of a process for promoting one or more second content items 122 to load prior to the first content items 120 when the availability of the first content items 120 is delayed. The process may be performed on the user device(s) 102, by the user device content promotion module 502 or by another module executing on the user device(s) 102, or elsewhere.

At 1102, a determination may be made of the page 118 to be presented in a user interface executing on the user device(s) 102. The user interface may be a user interface provided by the browser module 104, the user application 106, or another module executing on the user device(s) 102. As described herein, the page 118 may include one or more first content items 120 and one or more second content items 122. In some implementations, the determination of the page 118 may be based on the URL or other identifier included in the page request 108. The determination of the page 118 may also be based at least in part on receiving the source or other specification for the page 118 from the server device(s) 110.

At 1104, the delay 128 may be estimated or otherwise determined based at least in part one on or more of the following: a latency in receiving the first content item(s) 120 from a remote server, such as the server device(s) 110; or a render time to render or present the first content item(s) 120 on the user device(s) 102. Estimation of the delay 128 is described further with reference to FIG. 13.

At 1106, a determination may be made of at least one of the second content items 122 to be promoted to load earlier during the loading of the page 118 than initially designated. Such a determination may proceed similarly to that described above with reference to 1006.

At 1108, the second content item(s) 122 determined at 1106 may be promoted as described above, such that the promoted second content item(s) 122 are loaded in the user interface during the delay 128 while the first content item(s) 120 may be unavailable. In some implementations, such promotion may include modifying the source of the page 118 that is received at the user device(s) 102 in response to the page request 108, to alter the order in which the content items are specified in the source. At 1110, following the delay 128, the first content items 120 may be loaded for presentation in the user interface.

In some implementations, the determination to promote one or more second content items 122 may be based at least partly on a determination that the second content item(s) 122 may take longer to render or present on the user device(s) 102. In such cases, the second content item(s) 122 may be promoted such that their rendering may begin sooner than otherwise in the absence of promotion, providing more time for the rendering of the promoted second content item(s) 122.

Figure 12:
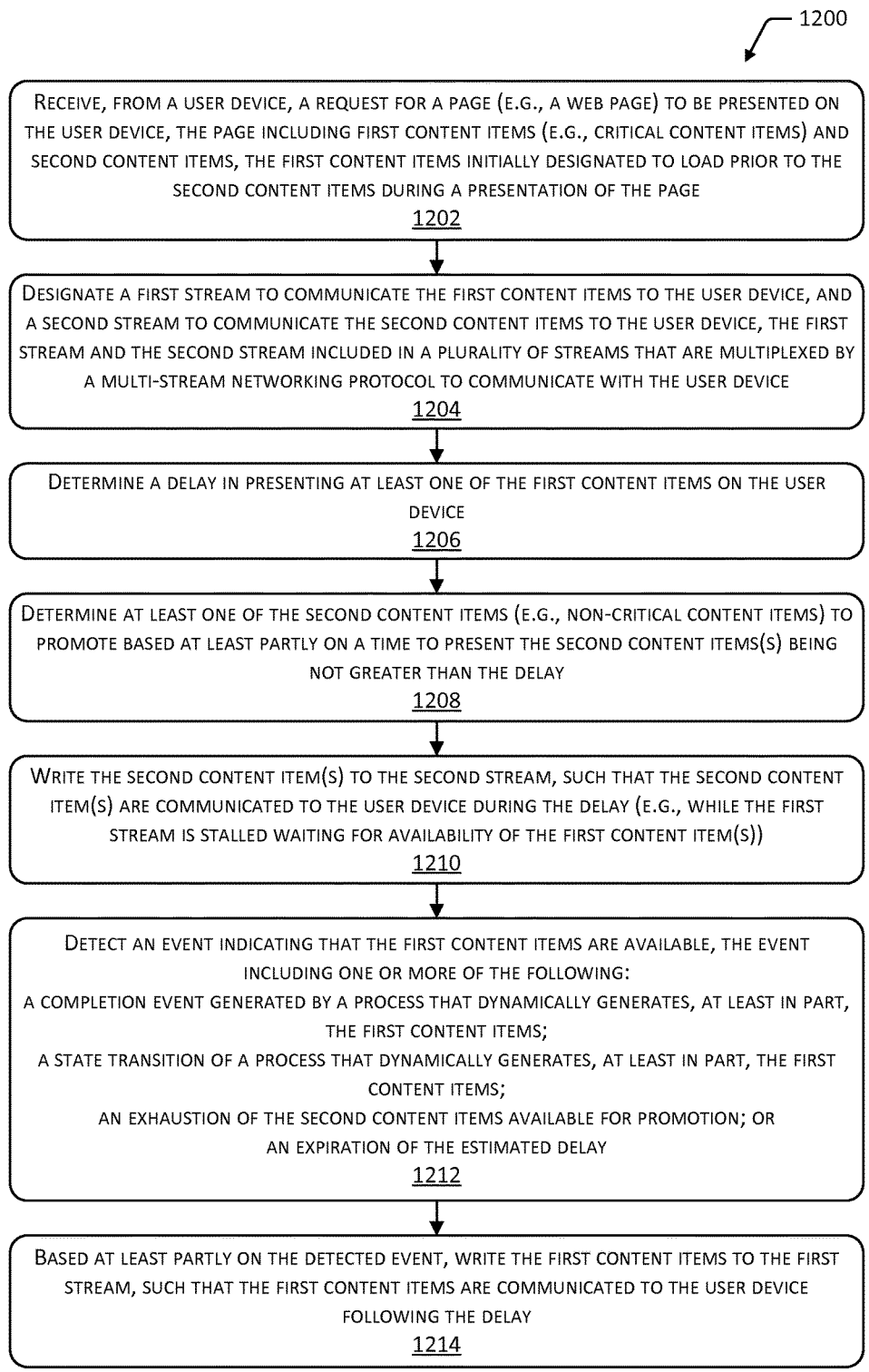
FIG. 12 depicts a flow diagram of a process for employing a multi-stream networking protocol to promote non-critical content items to load prior to critical content items when the availability of the critical content items is delayed.

FIG. 12 depicts a flow diagram 1200 of a process for employing a multi-stream networking protocol to promote one or more second content items 122 to load prior to the first content items 120 when the availability of the first content items 120 is delayed. The process may be performed on any of the server device(s) 110, such as a backend server, a primary server, a secondary server, a content server, an intermediate server, an edge server, a cloud computing server, and so forth. In some implementations, the process may be performed by the content promotion module 124, one or more of the content service modules 112, the multi-stream networking protocol module 602, other modules of a server device 110, or elsewhere.

At 1202, the page request 108 is received from the user device(s) 102, requesting delivery of content included in the page 118. As described herein, the requested page 118 may specify the first content item(s) 120 and the second content item(s) 122, the first content item(s) 120 being initially designated to load prior to the second content item(s) 122 during presentation of the page 118.

At 1204, the first stream 604 may be designated to communicate the first content item(s) 120 to the user device(s) 102, and the second stream 606 may be designated to communicate the second content item(s) 122 to the user device(s) 102. As described above with reference to FIGS. 6 and 7, the first stream 604 and the second stream 606 may be included in a plurality of streams that are multiplexed by a multi-stream networking protocol such as SPDY™. In some cases, the multiplexing of the plurality of streams may be performed over a single network connection to the user device(s) 102.

At 1206, the delay 128 may be estimated. Estimation of the delay 128 is described further with reference to FIG. 13.

At 1208, a determination may be made of at least one of the second content items 122 to be promoted to load earlier during the loading of the page 118 than initially designated. Such a determination may proceed similarly to that described above with reference to 1006.

At 1210, the information describing the second content item(s) 122 may be written to the second stream 606, such that the second content item(s) 122 are communicated to or loaded on the user device 102 during the delay 128. Having been written to the second stream 606, the second content item(s) 122 may be communicated to the user device(s) 102 during the delay 128 while the first stream 604 is stalled waiting for the availability of the first content items 120.

At 1212, an event may be detected that indicates that the first content item(s) 120 have become available for transport to the user device(s) 102. The event may include one or more of the following: a completion event (e.g., an IOCompletion event) generated by a process (e.g., content generation/retrieval module 114) that executes on the server device(s) 110 to retrieve or to dynamically generate, at least in part, the first content item(s) 120; a state transition of the process to a state indicating that the process has completed its generation or retrieval of the first content item(s) 120; an event indicating an exhaustion of the second content item(s) 122 available for promotion (e.g., indicating that there are no more available content items that may be promoted); or an expiration of the estimated delay 128.

At 1214, based at least partly on the event detected at 1212, the information describing the first content item(s) 120 may be written to the first stream 604 to be communicated to the user device(s) 102.

Figure 13:
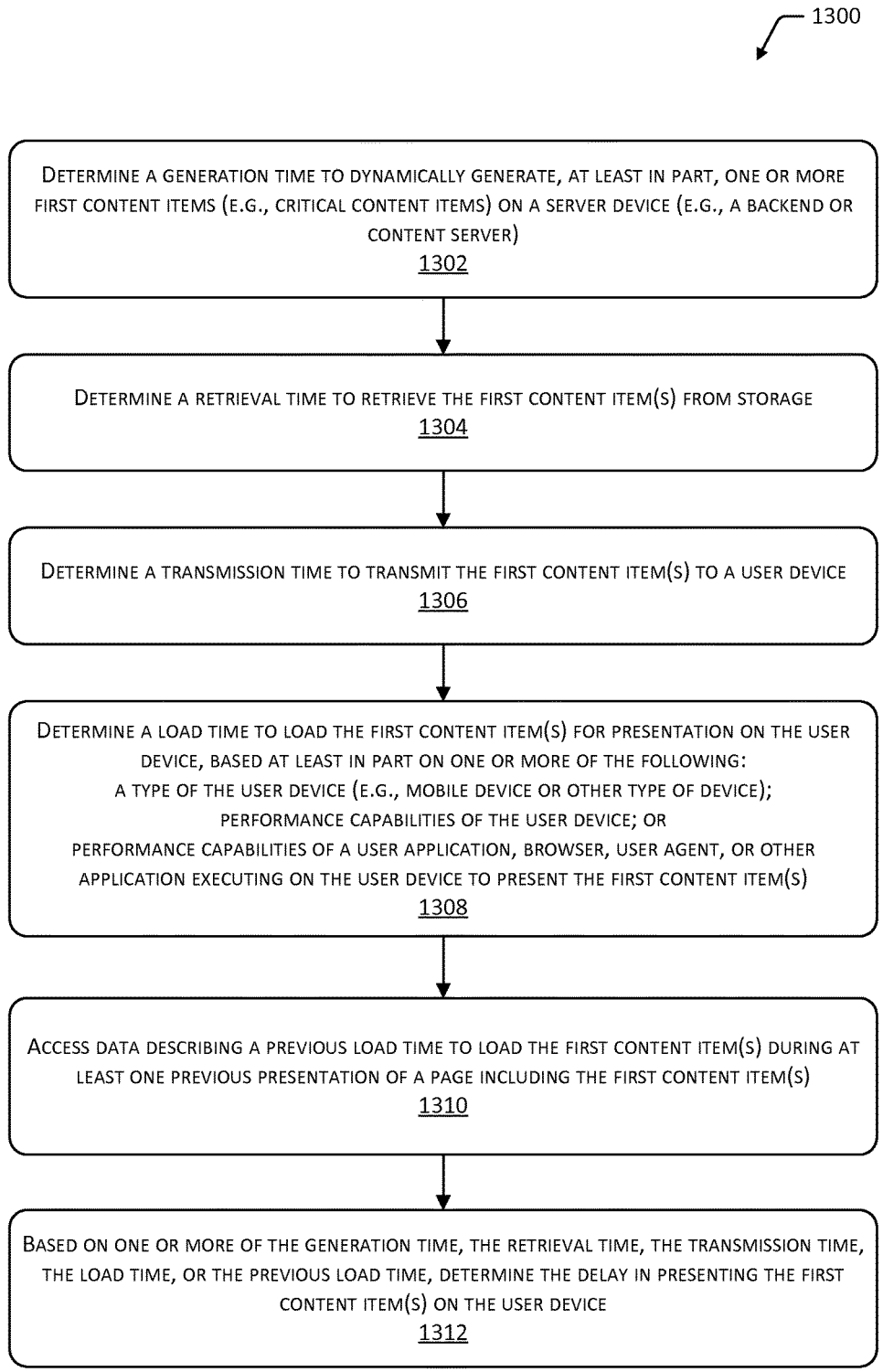
FIG. 13 depicts a flow diagram of a process for estimating or otherwise determining a delay in presenting critical content items on a user device.

FIG. 13 depicts a flow diagram 1300 of a process for estimating or otherwise determining the delay 128 in presenting the first content items 120 on the user device(s) 102. The process may be performed on any of the server device(s) 110 described herein, by the delay estimation module 126, the content service module 112, the content promotion module 124, or by other modules executing on the server device(s) 110. The process may also be performed on the user device(s) 102, by the user device content promotion module 502 or by other modules executing on the user device(s) 102.

At 1302, a determination is made of a generation time to dynamically generate, at least in part, one or more first content items 120 on the server device(s) 110, in cases where the first content items 120 are at least in part generated dynamically. The determination of the generation time may be based on characteristics of the first content item(s) 120 to be generated, such as a file size and file type of the first content item(s) 120. The determination of the generation time may also be based on the processing capacity, speed, or other characteristics of the server device(s) 110 where the first content item(s) 120 are to be generated. The determination of the generation time may also be based on characteristics of the process that executes to generate the first content item(s) 120.

At 1304, a determination is made of a retrieval time to retrieve one or more first content items 120 from the content storage 116. The determination of the retrieval time may be based on characteristics of the first content item(s) 120 to be retrieved, such as a file size of the first content item(s) 120. The determination of the retrieval time may also be based on characteristics (e.g., speed, bandwidth, latency, and so forth) of a network connecting the content storage 116 and the server device(s) 110 retrieving the first content item(s) 120. In some cases, the determination of the retrieval time may be further based on the processing capacity, speed, or other characteristics of the content storage 116 or of the server device(s) 110 retrieving the first content item(s) 120.

At 1306, estimate determination is made of a transmission time to transmit the first content item(s) 120 to the user device(s) 102. This determination may be based, at least in part, on characteristics (e.g., speed, bandwidth, latency, and so forth) of a network connecting the user device(s) 102 and the server device(s) 110.

At 1308, a determination is made of a load time to load the first content item(s) 120 for presentation on the user device(s) 102. This determination may be based, at least in part, on one or more of the following: a type of the user device 102, such as whether the user device 102 is a mobile device; performance capabilities of the user device 102, such as processing capacity, speed, memory available, and so forth; or performance capabilities of the user application 106, the browser module 104, or any other user agent that is executing on the user device 102 to present the content.

At 1310, data may be accessed that describes one or more previous load times associated with the loading of the first content item(s) 120 during at least one previous presentation of the page 118 or during a simulation of a presentation of the page 118. Such historical data may be employed to estimate or otherwise determine the delay 128.

At 1312, the delay 128 may be determined based on one or more of the generation time, the retrieval time, the transmission time, the load time, or the one or more previous load times determined at 1302, 1304, 1306, 1308, and 1310 respectively. The delay 128 may be employed to determine which, if any, of the second content item(s) 122 to promote.

In some implementations, the promotion of one or more second content items 122 may include sending the promoted second content item(s) 122 to the user device 102 prior to the sending of the delayed first content item(s) 120. In such cases, promotion may include the reordering of network packets, communications frames, or other communicated data portions that transport the content items to the user device 102, at any layer of a multi-layer communications model. Promotion based on packet reordering is described further with reference to FIG. 14. Promotion based on frame reordering is described further with reference to FIG. 15.

Figure 14:
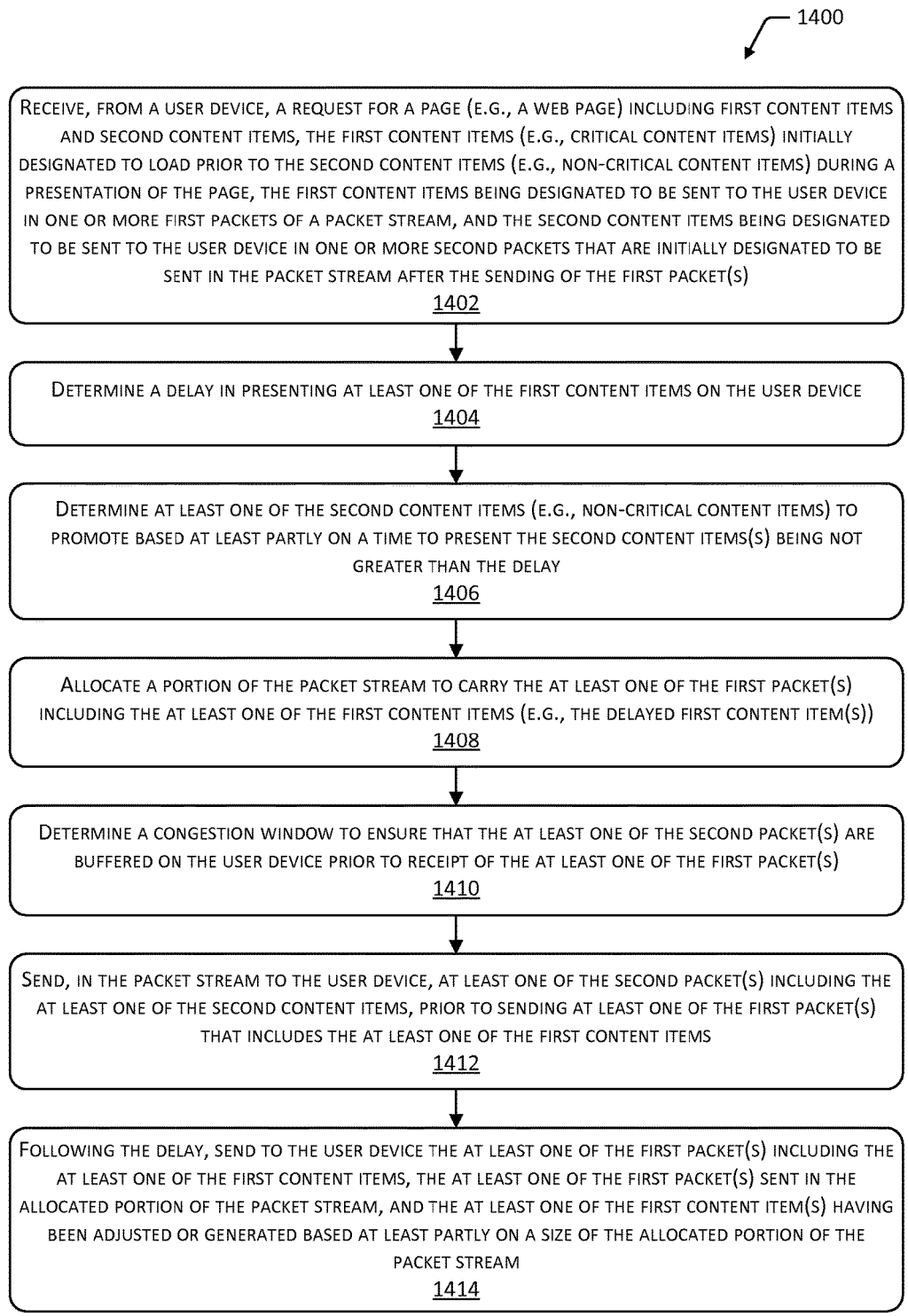
FIG. 14 depicts a flow diagram of a process for using packet reordering to promote non-critical content items to be sent to a user device prior to the sending of critical content items when the availability of the critical content items is delayed.

FIG. 14 depicts a flow diagram 1400 of a process for using packet reordering to promote one or more second content items 122 to be sent to the user device 102 prior to the sending of one or more first content items 120 when the availability of the first content item(s) 120 is delayed. The process may be performed on any of the server device(s) 110 described herein, by the delay estimation module 126, the content service module 112, the content promotion module 124, or by other modules executing on the server device(s) 110.

At 1402, the page request 108 may be received from the user device 102, as described above with reference to 1002. The requested page 118 may include the first content item(s) 120 and the second content item(s) 122. As described above, the first content item(s) 120 may include critical content item(s), and the second content item(s) 122 may include non-critical content item(s). In some cases, the first content item(s) 120 may be designated to be sent to the user device 102 in one or more first packets of a packet stream. The second content item(s) 122 may be designated to be sent to the user device 102 in one or more second packets that are initially designated to be sent after the sending of the first packet(s) in the packet stream. A packet stream may include any number of packets, associated with any packet type or any protocol, that are communicated over a network.

For example, the first content item(s) 120 and the second content item(s) 122 of the page 118 may be sent to a network interface, and the data for the content item(s) may be distributed among one or more network packets for communication to the user device 102. Such network packets may include TCP packets, Stream Control Transmission Protocol (SCTP) packets, or other packets that are at a transport layer of a multi-layer communications model such as the OSI model. The content item(s) may also be included in packets at any other layer of the multi-layer communications model. The first transport layer packet(s) (e.g., carrying data for the first content item(s) 120) may be incorporated into a first set of one or more network layer packets, such as IP packets that are at a network layer of the multi-layer communications model. The second transport layer packet(s) (e.g., carrying data for the second content item(s) 122) may be incorporated into a second set of one or more network layer packets, which are initially designated to be sent to the user device 102 following the first set of network layer packet(s). In some cases, the initial order designation may include a sequence numbering of the transport layer packets, with the first transport layer packet(s) having a lower sequence numbering than the second transport layer packet(s).

At 1404, a determination is made of the delay 128 in presenting at least one of the first content item(s) 120 on the user device 102. At 1406, a determination is made of at least one of the second content item(s) 122 to be promoted. The operations at 1404 and 1406 may proceed similarly as described above with reference to 1004 and 1006.

In some embodiments, at 1408 a portion (e.g., a window) of the packet stream may be reserved or otherwise allocated for the number of first packet(s) that were to be sent prior to the at least one of the second packet(s) in the absence of promotion. In some cases, this allocation may include estimating an amount of data that would have been sent in the first packet(s), and allocating the estimated amount in the packet stream following the second packet(s). In cases where the size of the packets is fixed, the allocated portion may be a multiplicative product of the number of the delayed first packet(s) and the packet size. For example, where the packet size is 1 kilobyte, and four first packet(s) are being delayed, the allocated portion may be 4 kilobytes.

In cases where the size of the packets is variable such that the packet size may range from a minimize size to a maximum size, the allocated portion may range from a minimum allocated size to a maximum allocated size. In such cases, the minimum allocated size may be the number of delayed first packet(s) multiplied by the minimum packet size, and the maximum allocated size may be the number of delayed first packet(s) multiplied by the maximum packet size. For example, the minimum packet size may be 100 bytes and the maximum packet size may be 1 kilobyte. Accordingly, if the number of first packet(s) is four, the allocated portion may range in size from 400 bytes to 4 kilobytes.

In some implementations, the first content item(s) 120 may be adjusted to ensure that the delayed first content item(s) 120 substantially fit into the portion of the packet stream that is allocated for the delayed first packet(s). Adjustment may include truncating the first content item(s) 120 to fit within the allocated portion. Adjustment may also include padding or augmenting the first content item(s) 120 to use the allocated portion. In cases where the packets correspond to a communication protocol that supports fixed size packets, such as Asynchronous Transfer Mode (ATM) packets (e.g., frames), implementations may truncate the first content item(s) 120 to fit within the allocated portion that is a number of the first packet(s) multiplied by the fixed packet size. In such cases with a fixed packet size, implementations may also augment or pad the first content item(s) 120 to use the allocated portion. Augmentation may include inserting spaces or other additional data into the first packet(s) carrying the first content item(s) 120. In cases where the packets correspond to a communication protocol with variable packet size, such as TCP or Ethernet packets, the first content item(s) 120 may be truncated to fit within the maximum packet size multiplied by the number of first packet(s).

In some implementations, the adjustment of the size of the first content item(s) 120 may be performed by one or more processes that generate the first content item(s) 120, such as the content generation/retrieval module 114. For example, the size of the allocated portion of the packet stream may be conveyed to the process(es) that generate the first content item(s) 120, which may then generate the first content item(s) 120 with a size corresponding to the size of the allocated portion. In some cases, the adjustment of the size of the first content item(s) 120 may include selecting particular first content item(s) 120 to send in the first packet(s) within the allocated portion of the packet stream, and not sending or further delaying the sending of other first content item(s) 120.

In some implementations where the first and second packets are TCP packets, at 1410 a size of a TCP congestion window may be adjusted. A congestion window may be employed when using TCP to communicate information over a network, the congestion window being associated with a number of outstanding packets that a client device (e.g., the user device(s) 102) and a server device (e.g., the server device(s) 110) may accept from each other. In some implementations, promotion operations may include specifying a TCP congestion window of a size that is large enough to accommodate the promoted second content item(s) 122 and the delayed first content item(s) 120. For example, in cases where the second content item(s) 122 are to be carried in five packets and the first content item(s) 120 are to be carried in four packets, the TCP congestion window may be set to a size corresponding to at least nine packets. Such a sizing of the TCP congestion window may ensure that the second content item(s) 122 are held in buffer and not dropped. For example, absent a large enough congestion window the user device(s) 102 receiving the second packet(s) may infer, based on the received second packet(s) being out of order in sequence number, that the first packet(s) have been lost. Specifying a large enough congestion window may ensure that the second packet(s) are held in buffer until the eventual receipt of the first packet(s).

At 1412, at least one of the second packet(s) may be sent to the user device 102 in the packet stream, the at least one of the second packet(s) including the at least one of the second content item(s) 122 that were designated for promotion at 1406. The sending of the second packet(s) may be performed prior to the sending of at least one of the first packet(s) that includes the delayed first content item(s) 120.

At 1414, following the delay 128 (e.g., when the first content item(s) 120 become available) the first packet(s) carrying the first content item(s) 120 may be sent to the user device 102 in the portion of the packet stream allocated at 1408. In this way, some implementations may provide for the promotion of second content item(s) 122 by sending the packets carrying the promoted second content item(s) 122 in an order that is different from the order in which the packets may have been sent absent promotion. In some implementations, the first content item(s) 120 may be adjusted or generated based at least partly on the size of the allocated portion of the packet stream. As described above, the adjustment may include generating the first content item(s) 120 to be of a size that substantially fits within the size of the allocated portion of the packet stream.

In some cases, various TCP packets may be routed differently over a network at the IP level, and accordingly may be received by the user device 102 in a different order from the order in which they were sent. On receiving the out-of-order transport layer packets, the user device 102 (or a network interface or controller operating on the user device 102) may buffer at least some of the earlier received packets until the later packets are received, and reconstruct the initial order of the TCP packets according to their sequence numbers. Such reconstruction of the initial order may be performed automatically on the user device 102 in accordance with TCP or in accordance with any other protocol that supports a sequential ordering of packets. Implementations may exploit this feature of network packet processing (e.g., in accordance with TCP) to reorder packets that were sent out-of-order from the server device(s) 110. For example, as described with reference to FIG. 14, implementations may promote the second content item(s) 122 to be sent in second packets prior to the sending of the first packets carrying the first content item(s) 120, instead of waiting for the first content item(s) 120 to become available. The out-of-order packets may then be reordered automatically following their arrival at the user device 102. By avoiding or mitigating a delay in data transmission due to the delayed availability of the first content item(s) 120, implementations may enable the communication of the contents of the page 118 more efficiently than may otherwise occur absent promotion.

Some implementations may include one or more modifications to a network controller, network interface, or network stack on the server device(s) 110, to enable the packet reordering described above. For example, modifications may be made to enable processes to write out-of-order TCP packets to a sequence of IP packets as described above. Such modification may enable processes to open, and write to an IP socket instead of opening, and writing to, a TCP socket on the server device(s) 110. The application code for a process, such as the content service module 112, may send a stream of out-of-order TCP packets to be included in the payloads of one or more IP packets to be communicated to the user device 102.

Alternatively, in some implementations the kernel of the server device(s) 110 may be modified to enable discrete TCP packets to be sent to the network interface in a designated order. For example, instead of writing bytes to a stream which is then distributed into TCP packets by the network interface, implementations may provide a driver that may be installed in the kernel and that may expose an application programming interface (API). Such an API may enable applications to request that data be sent in an out-of-order sequence of packets as described above.

The operations described in FIG. 14 may be performed on any device (e.g., a server side device) that generates IP packets to carry TCP packets including the content item(s) of the page 118. For example, a TCP connection may be formed between a server side device, such as a proxy server or other intermediate server, and a device on the client side of the connection. The device that terminates the TCP connection on the client side may be a gateway or other device that performs network address translation (NAT) operations for the user device(s) 102. In such cases, e.g., when IP version 4 is in use, the packet reordering on the client side may be performed at the NAT device, and the sending of the reordered packets may be performed on a proxy server on the server side of the connection. Alternatively, e.g., when IP version 6 is in use, the packet reordering on the client side may be performed at the user device 102 itself, given that IP version 6 may enable a connection between the user device(s) 102 and the server device(s) 110 that is substantially unmediated by a NAT device or another intermediate device.

Although the examples included herein describe promotion through the reorder of packets at the transport level, such as TCP or SCTP packets, implementations are not so limited. Implementations support packet reordering at any layer of a multi-layer communications model, including the reordering of any type of packets that are sequentially ordered according to a communications protocol that operates at any layer.

Figure 15:
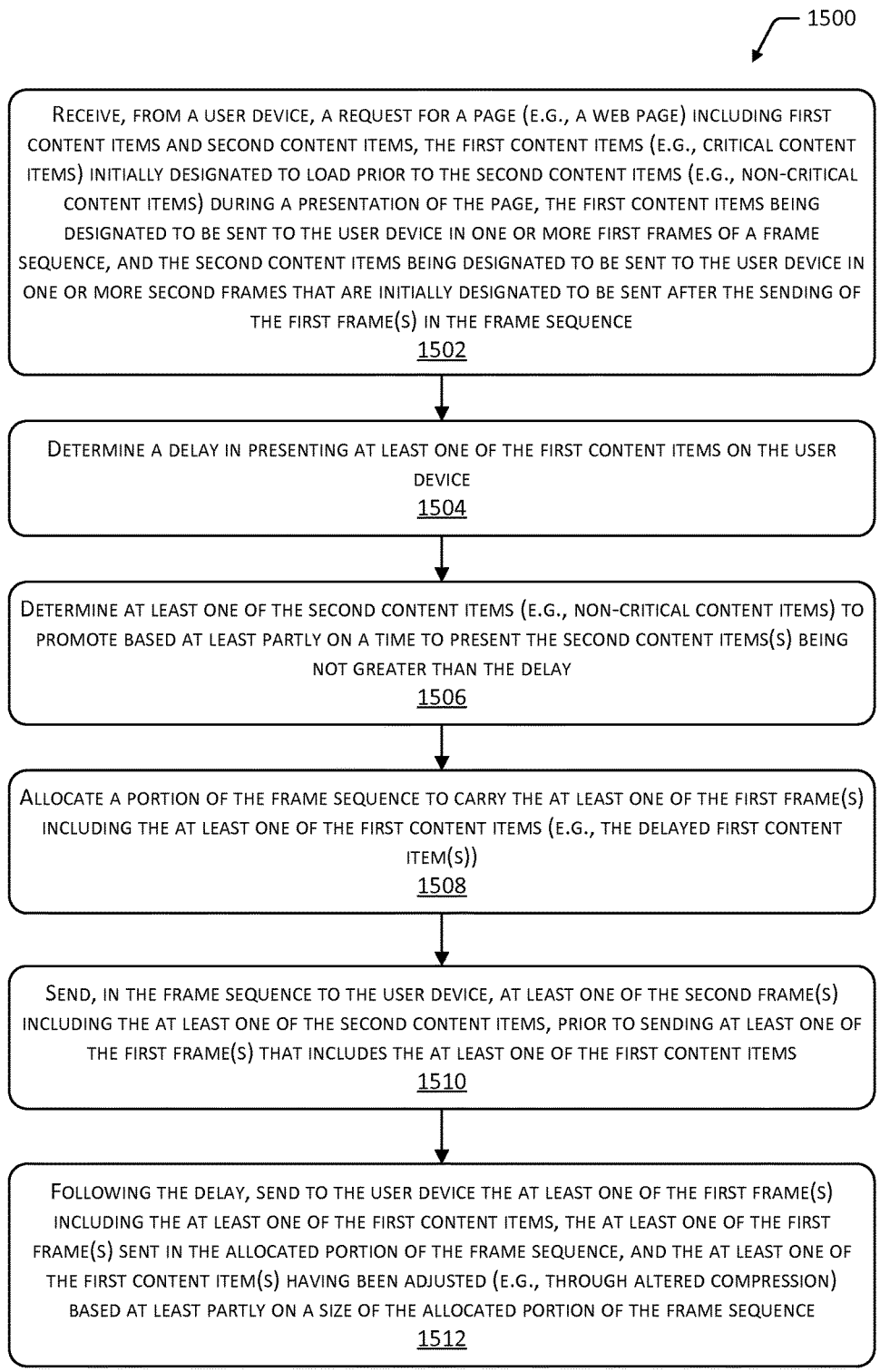
FIG. 15 depicts a flow diagram of a process for using frame reordering to promote non-critical content items to be sent to a user device prior to the sending of critical content items when the availability of the critical content items is delayed.

FIG. 15 depicts a flow diagram 1500 of a process for using frame reordering to promote one or more second content items 122 to be sent to the user device 102 prior to the sending of one or more first content items 120 when the availability of the first content item(s) 120 is delayed. The process may be performed on any of the server device(s) 110 described herein, by the delay estimation module 126, the content service module 112, the content promotion module 124, or by other modules executing on the server device(s) 110.

At 1502, the page request 108 may be received from the user device 102, as described above with reference to 1002. The requested page 118 may include the first content item(s) 120 and the second content item(s) 122. As described above, the first content item(s) 120 may include critical content item(s), and the second content item(s) 122 may include non-critical content item(s). In some cases, the first content item(s) 120 may be designated to be communicated to the user device 102 in one or more first communication frames of a frame sequence. The second content item(s) 122 may be designated to be sent to the user device 102 in one or more second communication frames that are initially designated to be sent after the sending of the first frame(s) in the frame sequence. In some cases, a frame may include a group of packets that may be an ordered group of packets. A frame sequence may include any number of frames.

At 1504, a determination is made of the delay 128 in presenting at least one of the first content item(s) 120 on the user device 102. At 1506, a determination is made of at least one of the second content item(s) 122 to promote. The operations at 1504 and 1506 may proceed similarly as described above with reference to 1004 and 1006.

In some embodiments, at 1508 a portion (e.g., a window) of the frame sequence may be reserved or otherwise allocated for the number of first frame(s) that were to be sent prior to the at least one of the second frames in the absence of promotion. In some cases, this allocation may include estimating an amount of data that would have been sent in the first frame(s), and allocating the estimated amount in the frame sequence following the second frame(s). In cases where the size of the frames is fixed, the allocated portion may be a multiplicative product of the number of the delayed first frame(s) and the frame size. For example, where the frame size is 1 kilobyte, and four first frame(s) are being delayed, the allocated portion may be 4 kilobytes.

In cases where the size of the frames is variable such that the frame size may range from a minimize size to a maximum size, the allocated portion may range from a minimum allocated size to a maximum allocated size. In such cases, the minimum allocated size may be the number of delayed first frame(s) multiplied by the minimum frame size, and the maximum allocated size may be the number of delayed first frame(s) multiplied by the maximum frame size. For example, the minimum frame size may be 100 bytes and the maximum frame size may be 1 kilobyte. Accordingly, if the number of first frame(s) is four, the allocated portion may range in size from 400 bytes to 4 kilobytes.

In some implementations, the first content item(s) 120 may be adjusted to ensure that the delayed first content item(s) 120 fit into the portion of the frame sequence that is allocated for the delayed first frame(s). In some cases, the adjustment of the first content item(s) 120 may include adjusting a rate of compression of the first content item(s) 120, or altering a compression algorithm employed to compress the first content item(s) 120. For example, when the first content item(s) 120 include content that is compressed according to a dictionary-based compression algorithm such as a ZIP-based algorithm, altering the compression may include employing a different compression dictionary for various frames. Altering the compression may also include compressing certain frames and not compressing other frames. In some cases, compression may be altered by determining to compress one or more particular types of data (e.g., textual data or metadata such as HTML) and determining not to compress other types of data (e.g., image data that may already be in a compressed format, such as the Joint Photographic Experts Group (JPEG) image format). In some cases, the determination to adjust the rate of compression of the first content item(s) 120 may be based at least in part on considerations regarding the additional latency that may be incurred by altering the compression.

At 1510, at least one of the second frame(s) may be sent to the user device 102 in the frame sequence, the at least one of the second frame(s) including the at least one of the second content item(s) 122 that were designated for promotion at 1506. The sending of the second frame(s) may be performed prior to the sending of at least one of the first frame(s) that includes the delayed first content item(s) 120.

At 1512, following the delay 128 (e.g., when the first content item(s) 120 become available) the first frame(s) carrying the first content item(s) 120 may be sent to the user device 102 in the allocated portion of the frame sequence. In some implementations, the first content item(s) 120 may be adjusted based at least partly on a size of the allocated portion of the frame sequence, as described above. In this way, some implementations may provide for the promotion of second content item(s) 122 by sending the frames carrying the promoted second content item(s) 122 in an order that is different from the order in which the frames may have been sent absent promotion.

In some implementations, the inclusion of the first content item(s) 120 and the second content item(s) 122 in one or more frames may be similar to the packet-based communications described with reference to FIG. 14, but with processing being performed at the frame level instead of at the packet level. For example, content may be incorporated into one or more frames that operate at an application layer of the multi-layer communications model such as the OSI model, instead of into one or more packets at the transport or network layer. Such framing may be based on SPDY™, or on any other process at the application layer that communicates data using an ordered sequence of communications frames. Implementations also support framing at any other layer of a multi-layer communications model.

In some implementations where the framing is at the application layer, one or more modifications may be made to an application server or other software executing on the server device(s) 110 to enable the application server (or other software) to send out-of-order frames to a network controller, network interface, or network stack. Implementations may also include one or more modifications to software executing on the user device(s) 102 to enable the software to receive out-of-order frames and to reorder them before sending the reordered frames on to the user application 106 or the browser module 104.

In some implementations, the promotion of content items may employ one or more priority indicators incorporated into the specification (e.g., source) of the page 118. Such priority indicators may be incorporated into the page 118 at a content server or another server device 110 before the page 118 is served to the user device 102, and may provide to the user device 102 a suggestion or a hint of an order in which to request content items for the page 118. Incorporation of priority indicators may include modifying the source of retrieved, static pages. Incorporation of priority indicators may also include dynamically generating dynamic pages to include the priority indicators.

Figure 16:
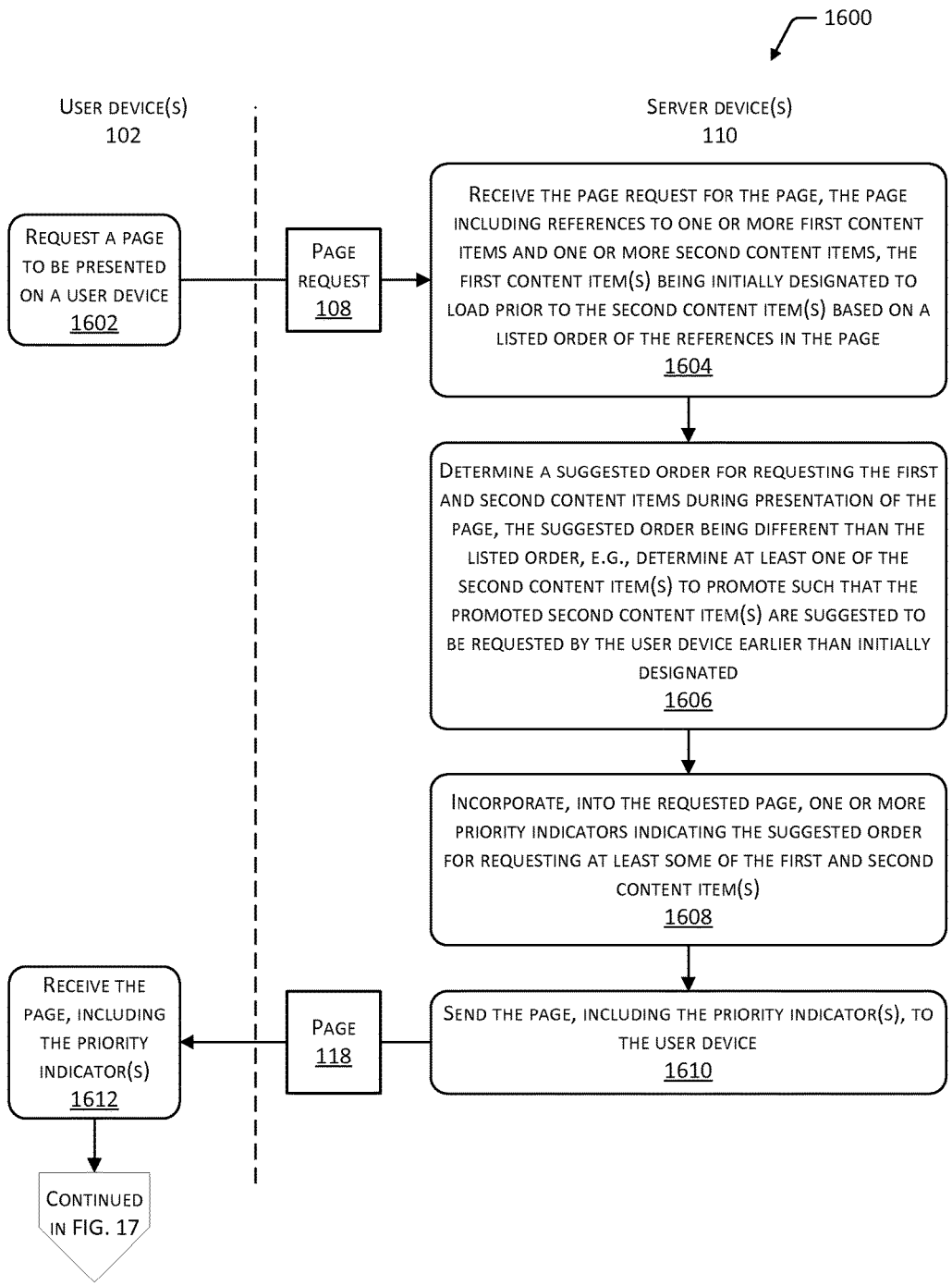
FIG. 16 depicts a flow diagram of a process for promoting content items by incorporating priority indicators into a page, the priority indicators indicating a suggested order for requesting the content items.

FIG. 16 depicts a flow diagram 1600 of a process for promoting content items by incorporating priority indicators into the page 118, where the priority indicators suggest an order for requesting the content items. In the example of FIG. 16, operations of the process are depicted as being performed on the user device(s) 102 or the server device(s) 110, including any of the server devices 110 described herein. Operations performed on the user device(s) 102 may be performed by any module executing on the user device(s) 102, including but not limited to the browser module 104, the user application 106, the user device content promotion module 502, and so forth. Operations performed on the server device(s) 110 may be performed by any module executing on any of the server devices 110, including but not limited to the content service module 112, the content promotion module 124, and so forth.

At 1602, the browser module 104 or another module executing on the user device 102 may generate the page request 108, requesting the page 118 to be presented on the user device 102. The page request 108 may be sent to the server device(s) 110 as described above.

At 1604, the content service module 112 or another process executing on the server device(s) 110 may receive the page request 108. As described above, the requested page 118 may include references to one or more first content items 120 and one or more second content items 122. For example, in cases where the page 118 is specified using any version of HTML, DHTML, XHTML, or some other markup language, the content item references may be metadata tags that identify or otherwise reference the content items, provide a location where the content items may be retrieved, provide attributes that indicate how the content items may be presented, and so forth. The first content item(s) 120 may be initially designated to load prior to the second content item(s) 122 based on a listed order of references in the page 118. In cases where the page 118 is a substantially static page, such an initial order designation may be based on the references to the first content item(s) 120 occurring earlier than the references to the second content item(s) 122 in the source of the page 118. The first content item(s) 120 may include critical content items as described above. In cases where the page 118 is a substantially dynamic page that is at least partly generated in response to the page request 108, the initial order designation may be determined by one or more processes that generate the page 118 in the absence of promotion operations.

At 1606, a determination is made of a suggested order for requesting the first content item(s) 120 and the second content item(s) 122 during a presentation of the page 118. The suggested order may differ, at least partly, from the listed order of the references in the page 118. In some cases, the determination of the suggested order is based on a determination to promote one or more of the second content item(s) 122, such that the promoted second content item(s) 122 may be requested by the user device 102 earlier than initially designated. The decision to promote one or more of the second content item(s) 122 may proceed as described with reference to FIG. 10. For example, the decision to promote one or more of the second content item(s) 122 may be based on the determined delay 128 in the availability of one or more of the first content item(s) 120, as described with reference to FIGS. 10 and 13.

The decision to promote may also be based at least partly on user experience considerations. For example, based on historical data describing the behaviors of previous users on the page 118 or other pages, certain content items may be determined to contribute to a substantially positive user experience or may be determined to have contributed to at least one transaction (e.g., product purchase) completed through the page 118. Such content items may be promoted to load earlier than initially designated.

In some cases, the decision to promote may be based at least partly on a determination that one or more other content items depend on a prior loading or presentation of the promoted second content item(s) 122. For example, a decision may be made to promote an image content item specifying an image that is of unknown size prior to its loading, given that the size of the image may affect the page layout in general. In some cases, a browser may not render the remainder of the page 118 until the size of the image is known (e.g., until the image is loaded). Accordingly, implementations may promote the image content item to enable the remainder of the page 118 to be rendered earlier than it may otherwise be rendered absent such promotion. As another example, a decision may be made to promote script objects, code objects, or other types of objects on which other content items depend. For example, the loading of one or more JavaScript objects may depend on a particular JavaScript library having been previously loaded, or script objects for menu items may depend on the prior loading of the script describing the menu itself. In such cases, the content item for the depended-upon object may be promoted based on the dependency of other objects.

At 1608, one or more priority indicators may be incorporated into the page 118. Such priority indicator(s) may indicate, suggest, or hint at the suggested order in which one or more content items of the page 118 may be requested by the user device 102. In cases where one or more second content item(s) 122 are promoted to load prior to one or more first content item(s) 120, the priority indicator(s) may indicate such promotion. Implementations may also employ the priority indicator(s) to suggest an order in which the user device 102 may request any or all of the content items in the page 118, including but not limited to the first content items 120 and the second content items 122.

Figure 17:
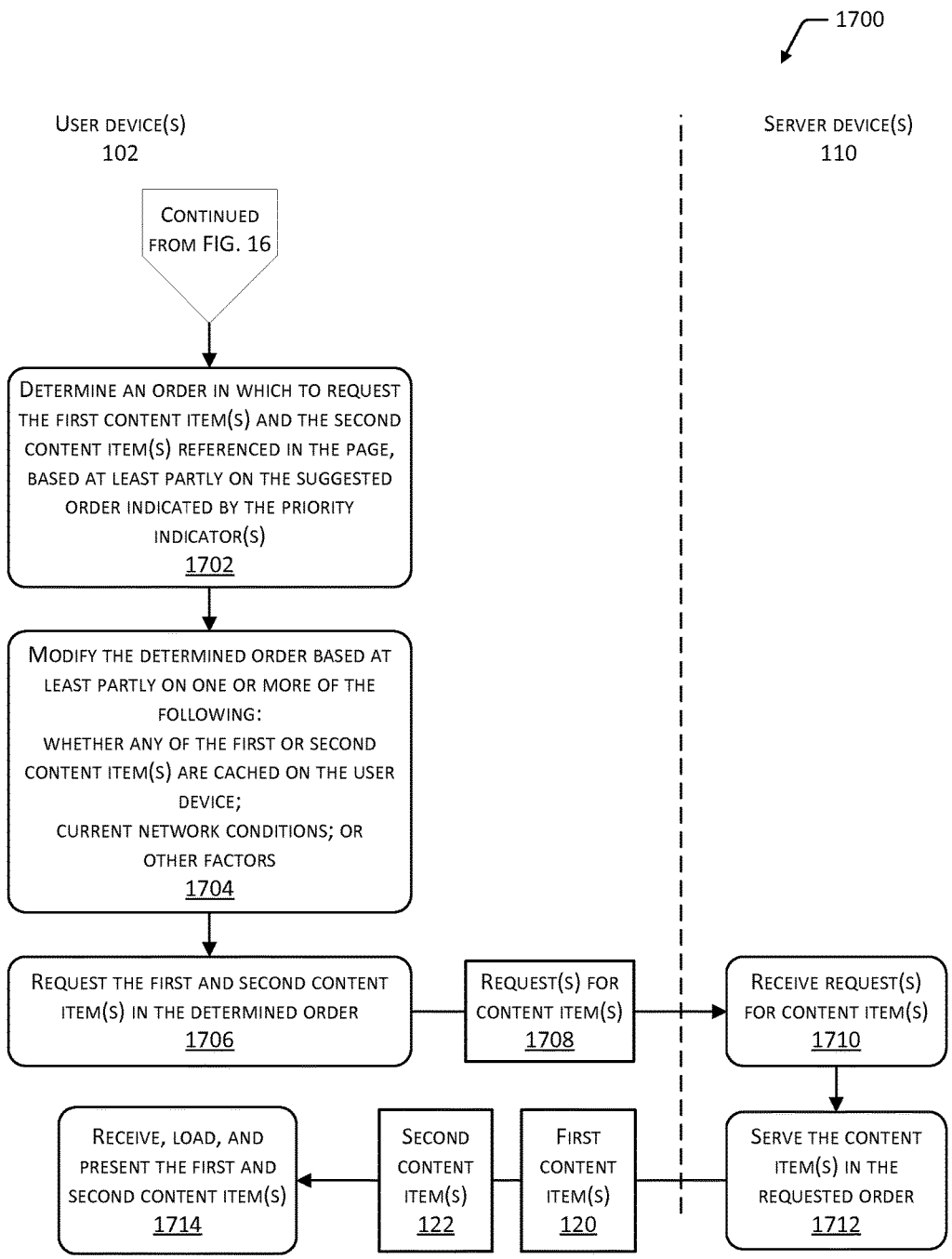
FIG. 17 depicts a flow diagram of a process for receiving and processing a page that includes priority indicators that indicate a suggested order for requesting content items in the page.

In some implementations, the priority indicator(s) may suggest or hint at an order in which the content items may be requested by the user device 102, and the browser module 104 or other module of the user device 102 may determine a request order by considering the suggested order in view of other considerations as described further with reference to FIG. 17. Alternatively, in some implementations the priority indicator(s) may indicate an order in which the content items are to be requested by the browser module 104 or other module of the user device 102, e.g., providing for substantially no discretion by the user device 102 in determining the request order.

In some implementations, the priority indicators may be incorporated as metadata elements into the source or specification of the page 118. For example, in cases where the page 118 is described using a version of HTML, the priority indicators may be incorporated as attributes in the HTML tags that reference one or more content items such as images, scripts, text elements, and so forth. Examples of such metadata based priority indicators are described further with reference to FIGS. 18 and 19.

At 1610, the page 118 including the incorporated priority indicator(s) may be sent to the user device 102. At 1612, the browser module 104 or another module of the user device 102 may receive the page 118, including the priority indicator(s). The processing of the received page 118 on the user device 102 is described further with reference to FIG. 17.

FIG. 17 depicts a flow diagram 1700 of a process for processing the page 118 including priority indicators that indicate a suggested order for requesting content items in the page 118. In the example of FIG. 17, operations of the process are depicted as being performed on the user device(s) 102 or the server device(s) 110, including any of the server devices 110 described herein. Operations performed on the user device(s) 102 may be performed by any module executing on the user device(s) 102, including but not limited to the browser module 104, the user application 106, the user device content promotion module 502, and so forth. Operations performed on the server device(s) 110 may be performed by any module executing on any of the server devices 110, including but not limited to the content service module 112, the content promotion module 124, and so forth.

At 1702, the browser module 104 or another module executing on the user device 102 may determine an order in which to request the content items referenced in the page 118, such as the first content item(s) 120 and the second content item(s) 122. The determined order of requests may be based at least partly on the order suggested or otherwise indicated by the priority indicator(s) incorporated into the page 118 as described above with reference to FIG. 16.

At 1704, in some implementations the order may be modified or further determined based on one or more other considerations. In some cases, the order may be modified based on a determination that one or more content items for the page 118 are currently cached or otherwise stored in memory on the user device 102, and that such cached content items were cached recently enough that they may reflect the current versions of the content items available through the server device(s) 110. For example, one or more priority indicators may suggest that a particular second content item 122 be promoted to load prior to a particular first content item 120, based on the delay 128 in the availability of the particular first content item 120. The browser module 104 may determine that a substantially current version of the first content item 120 is available in cache on the user device 102, and may therefore choose to disregard the suggested request order indicated by the priority indicators.

In some implementations, the order may be modified based on current network conditions (e.g., bandwidth, latency, and so forth) of one or more networks that enable communications between the user device 102 and other devices. Such network conditions may be measured at the user device 102. Alternatively, data describing the network conditions may be measured at another device and communicated to the user device 102. For example, one or more priority indicators may suggest that a particular second content item 122 be promoted to load prior to a particular first content item 120. However, it may be determined that the second content item 122 may be delivered substantially more slowly to the user device 102 than the first content item 120, based on current network conditions on network path over which the second content item 122 may be delivered. In such cases, the browser module 104 or another module of the user device 102 may disregard the suggested request order indicated by the priority indicator(s). Implementations may determine the request order based on the order indicated by the priority indicator(s), based on whether content items are locally cached, based on current network conditions, or based on other factors and considerations.

At 1706, the content items of the page 118 (e.g., the first content item(s) 120, the second content item(s) 122, or other content items) may be requested in one or more requests for content items 1708 sent from the user device(s) 102 to the server device(s) 110. The one or more requests for content items 1708 may be sent in the order determined at 1702 and 1704.

At 1710, the request(s) for content item(s) 1708 may be received at the server device(s) 110. At 1712, the requested content item(s) may be served to the user device(s) 102. In some cases, the content item(s) may be served according to the order in which they were requested.

At 1714, the requested content items (e.g., the first content item(s) 120, the second content item(s) 122, or other content items) may be received, loaded, and presented by the browser module 104 or another module executing on the user device 102.

Figure 18:
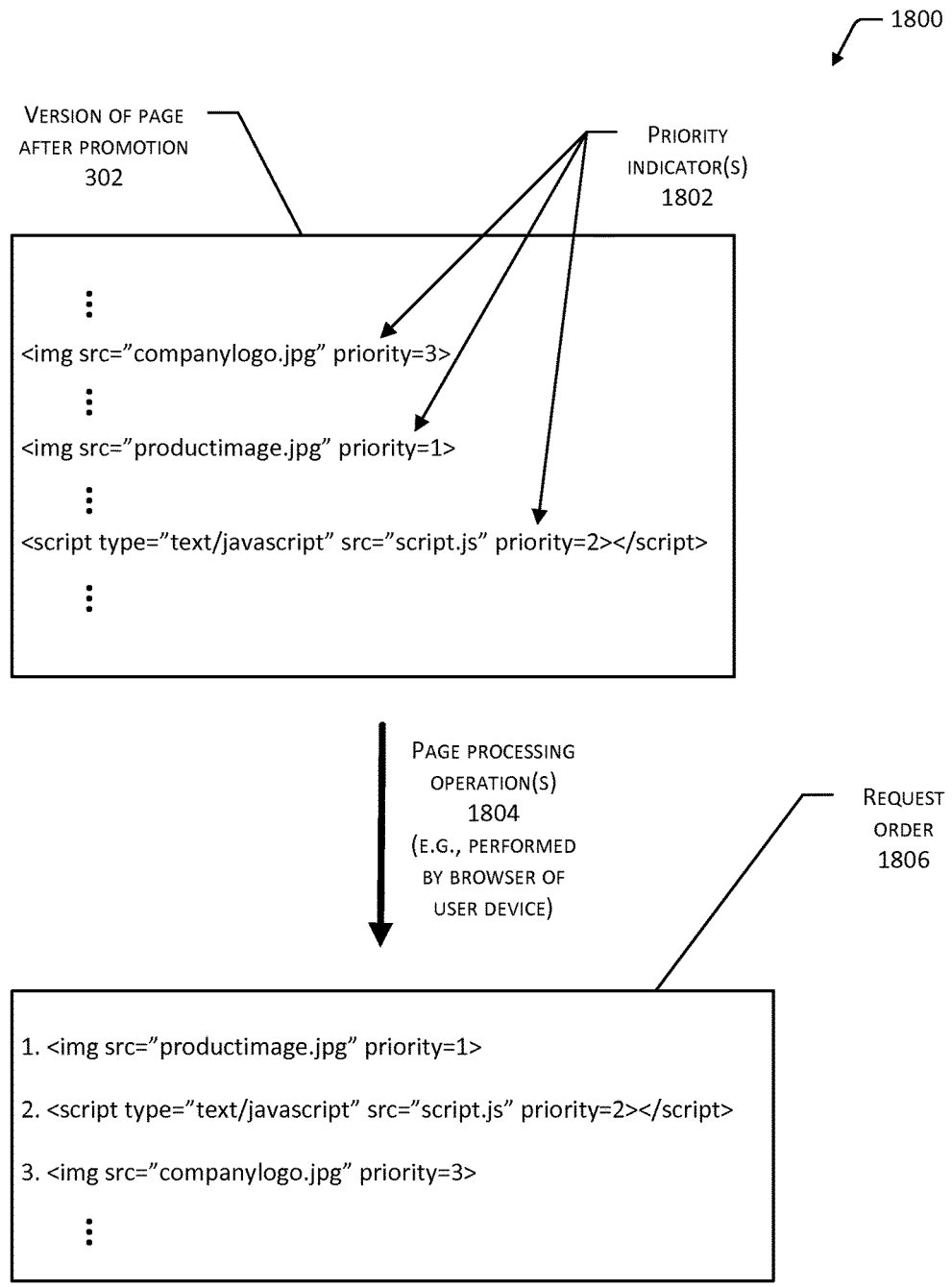
FIG. 18 depicts a schematic illustrating the determination of a request order for requesting content items for a page based on priority indicators indicating a suggested request order.

FIG. 18 depicts a schematic 1800 illustrating the determination of a request order for requesting content items based on priority indicators indicating a suggested request order. As shown in FIG. 18, the source or specification of the page 118 has been modified or generated to provide the version of the page after promotion 302. In this example, the page 118 has been modified or generated to incorporate one or more priority indicators 1802 as attributes in the metadata tags associated with one or more content items. Through one or more page processing operations 1804 performed by the browser module 104 or another module of the user device 102 (e.g., as described with reference to FIG. 17), a request order 1806 may be determined. The browser module 104 (or another module) may then request the content items in the determined order. As illustrated in FIG. 18, the priority indicator(s) 1802 may suggest a request order 1806 that is different from an order in which the content items were initially designated in the page 118.

Although FIG. 18 depicts the priority indicator(s) 1802 incorporated into the page 118 as HTML attributes in HTML tags corresponding to the content items, implementations are not so limited. Implementations may support the use of priority indicators that are incorporated into the page 118 as any type of data or metadata, in accordance with any markup language or any other type of language employed to describe a page. Moreover, although FIG. 18 depicts the priority indicator(s) 1802 indicating a numeric order (e.g., 1, 2, 3, and so forth), implementations support other types of priority indicators 1802. For example, the priority indicators 1802 may provide a non-numeric suggestion of a request order, such as a high, medium, or low priority. Further, although FIG. 18 depicts the priority indicator(s) 1802 indicating an order along a single dimension, employing a single variable (e.g., the priority attribute), implementations support the use of priority indicator(s) 1802 that specify information along multiple dimensions or that use one or more variables. Implementations may also support priority indicator(s) 1802 as metadata elements that are identified using attributes other than "priority."

Figure 19:
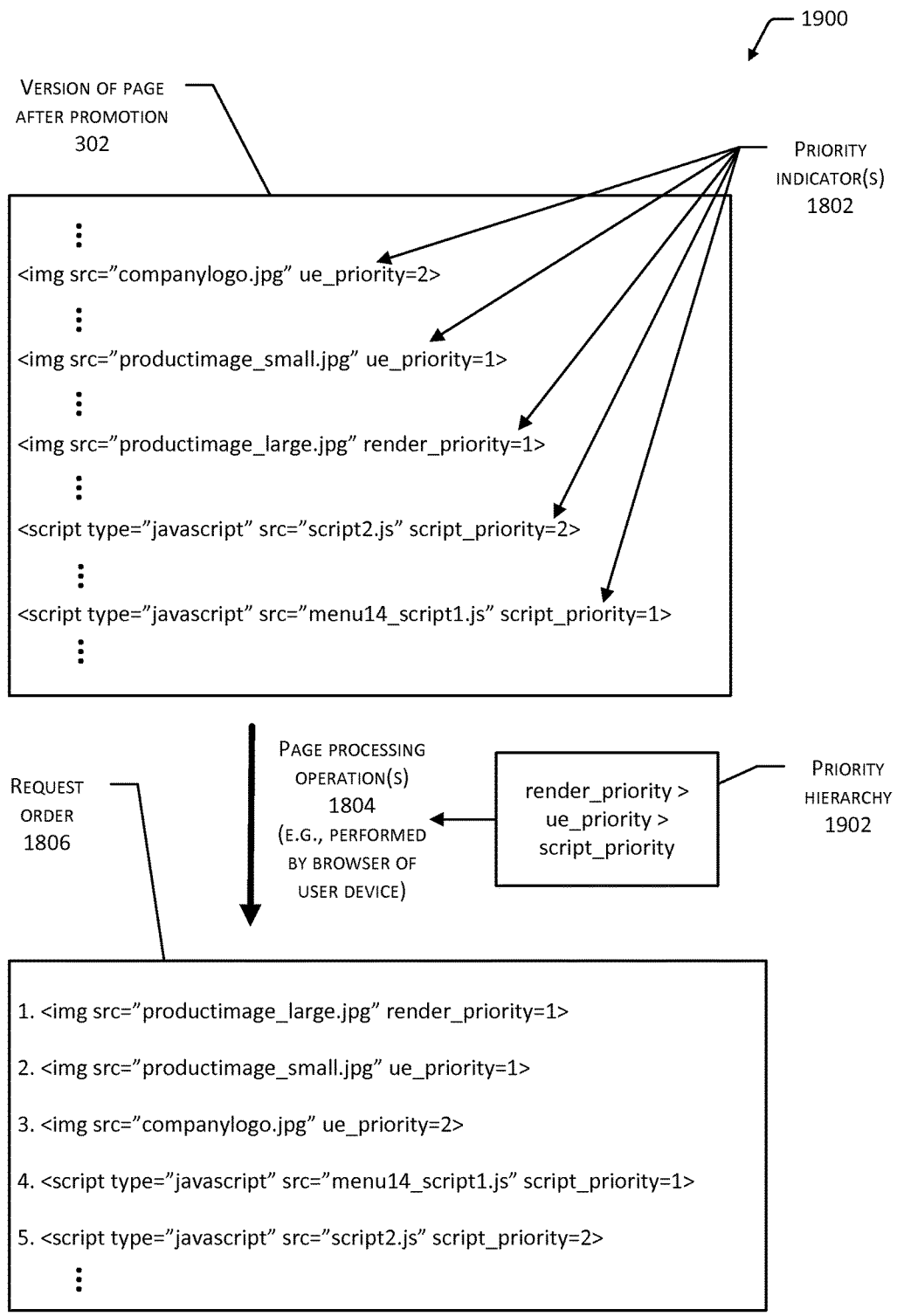
FIG. 19 depicts a schematic illustrating the determination of a request order for requesting content items included in a page based on priority indicators indicating a suggested request order, in cases where the priority indicators are associated with a priority hierarchy of multiple priority levels.

FIG. 19 depicts a schematic 1900 illustrating the determination of the request order 1806 for requesting content items included in the page 118 based on the priority indicator(s) 1802 indicating a suggested request order. FIG. 19 illustrates implementations in which the priority indicator(s) 1802 include multiple dimensions. In the example of FIG. 19, the priority indicator(s) 1802 are specified according to a priority hierarchy 1902. A first dimension of the priority indicator(s) 1802 may be indicated by the name or identifier (e.g., the HTML attribute) that designates the priority indicator 1802, e.g., ue_priority, script_priority, or render_priority as shown in FIG. 19. A second dimension of the priority indicator(s) 1802 may be indicated by their value, e.g., 1, 2, 3, and so forth.

In the example of FIG. 19, three types of priority indicator(s) 1802 are depicted: ue_priority, render_priority, and script_priority. The ue_priority type of the priority indicator 1802 may indicate that the decision to promote was based at least partly on user experience considerations. As described above with reference to FIG. 17, such user experience considerations may, for example, be based on a determination that particular content items previously contributed to a substantially positive user experience or a completed purchase. The render_priority type of the priority indicator 1802 may indicate that the decision to promote was based at least partly on a determination that unknown characteristics of a content item may block the rendering of the page 118 until the content item is rendered. For example, as described above an unknown image size may affect page layout, and may therefore block the loading of other elements of the page 118 until the image is loaded. The script_priority type of the priority indicator 1802 may indicate that the decision to promote was based at least partly on a determination that other content items may depend on the loading of the promoted content item. Such dependencies may include dependencies between script or code elements as described above, or through other types of dependencies.

Some implementations may provide the priority hierarchy 1902 that indicates a priority ordering between the various types of the first dimension of the priority indicators 1802. For example, as shown in FIG. 19, render_priority may be given a higher priority than ue_priority, which may be given a higher priority than script_priority. The browser module 104, or another module of the user device 102, may sort the content items of the page 118 according to their priority indicator(s) 1802 to determine the request order 1806. In some implementations, such sorting may be performed first on the type of the priority indicator 1802, according to the priority hierarchy 1902. Secondary sorting may then be performed based on the values of the priority indicators 1802 (e.g., the values of the attributes). For example, as shown in FIG. 19 the request order 1806 includes first the render_priority content items (sorted based on their numeric values), followed by the ue_priority content items (sorted based on their numeric values), followed by the script_priority content items (sorted based on their numeric values).

Although FIG. 19 illustrates an example in which the priority indicator(s) 1802 include multiple dimensions associated with the priority hierarchy 1902, implementations are not limited to this particular example. Implementations support other priority indicator(s) 1802 that include multiple dimensions. For example, in some implementations the priority indicator(s) 1802 may be metadata attributes of a form "type:N" where "N" may be any numeric value (e.g., 1, 2, 3, and so forth) and "type" may indicate a type of the first dimension (e.g., ue, render, script and so forth). The priority hierarchy 1902 may describe a hierarchy between these various types as described above, such as render ranked higher than ue, and ue ranked higher than script. Thus, a metadata tag referencing a resource may include the attribute "priority=ue:2", indicating that the resource has been assigned the first dimension priority of ue, and the second dimension priority of 2. Another metadata tag may include the attribute "priority=render:3", indicating that a resource has been assigned the first dimension priority of render, and the second dimension priority of 3.

In some cases, the various types of the priority indicator(s) 1802 may be assigned based at least partly on whether content items of the page 118 are static or dynamic. For example, static elements of the page 118 may be assigned render_priority or script_priority types of priority indicator(s) 1802 based on expected behaviors of such elements (e.g., predetermined dependencies between elements, predetermined uncertainties in size of images, and so forth). Dynamic elements of the page 118 may be assigned ue_priority types of priority indicator(s) 1802 based on past, observed user behaviors.

In some implementations where the priority indicator(s) 1802 are incorporated as metadata elements (e.g., HTML attributes), modifications may be made to enable the browser module 104 to parse and interpret the metadata elements. In cases where the priority indicator(s) 1802 are incorporated as HTML attributes that modify previously supported HTML tags (e.g., for images, objects, scripts, and so forth), such modifications may enable more recent browsers to interpret the attributes. Older (e.g., unmodified) browsers may ignore the priority indicator(s) 1802 as unknown HTML attributes, and may render the page 118 while disregarding the priority indicator(s) 1802. Accordingly, page(s) 118 that include the priority indicator(s) 1802 may still be displayable in the older browsers.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Embodiments of the disclosure can be described in view of the following clauses:

Clause 1: A computer-implemented method, comprising:

receiving from a user device a request for a web page, the web page including one or more first content items and one or more second content items, the one or more first content items being initially designated to load prior to the one or more second content items during a presentation of the web page on the user device, the one or more first content items including content previously identified as contributing to a completion of at least one transaction through the web page;

based at least partly on data describing at least one previous presentation of the web page, determining a delay in presenting at least one of the one or more first content items;

determining whether to promote any of the one or more second content items to be loaded before the one or more first content items, wherein the determination of whether to promote any of the one or more second content items is based at least partly on a previous presentation of the web page and on a time for presenting at least one of the second content items being less than or equal to the delay;

in response to determining to promote at least one of the one or more second content items, sending, to the user device, the at least one of the one or more second content items to be loaded for presentation on the user device at least partly during the delay; and sending, to the user device, the one or more first content items to be loaded for presentation on the user device following the delay.

Clause 2: The method of clause 1, wherein the delay in presenting the at least one of the first content items is at least partly associated with one or more of:

a generation time to dynamically generate, at least in part, the at least one of the first content items;

a retrieval time to retrieve the at least one of the first content items from storage;

a transmission time to transmit the at least one of the first content items to the user device; or a load time to load the at least one of the first content items for presentation on the user device.

Clause 3: The method of any one of clauses 1 and 2, wherein the web page is described at least partly using one or more of: Hypertext Markup Language (HTML); JavaScript; Cascading Style Sheets (CSS); Scalable Vector Graphics (SVG); or Virtual Reality Modeling Language (VRML).

Clause 4: The method of any one of clauses 1-3, wherein the one or more first content items describe one or more of a product or a service that is available for purchase through the web page.

Clause 5: A system, comprising at least one computing device configured to implement one or more services, wherein the one or more services are configured to:

determine a page of content to be presented on a user device, the page including one or more first content items and one or more second content items, the one or more first content items being initially designated to load prior to the one or more second content items during a presentation of the page;

determine a delay in presenting at least one of the one or more first content items;

determine whether a time for presenting at least one of the one or more second content items is less than or equal to the delay; and in response to determining that the time for presenting at least one of the one or more second content items is less than or equal to the delay, provide the at least one of the one or more second content items to be loaded for presentation on the user device at least partly during the delay and provide the one or more first content items to be loaded for presentation on the user device following the delay.

Clause 6: The system of clause 5, wherein the one or more first content items include content previously identified as contributing to a completion of at least one transaction through the page.

Clause 7: The system of any one of clauses 5 and 6, wherein the determining of the delay is based at least partly on data describing at least one previous presentation of the page.

Clause 8: The system of any one of clauses 5-7, wherein:

the at least one of the one or more first content items are initially designated to load prior to the one or more second content items based on the at least one of the first content items being included in a head section of the page; and the at least one of the second content items are initially designated to load following the at least one of the first content items, based on the at least one of the second content items being included in one or more sections of the page that are subsequent to the head section.

Clause 9: The system of any one of clauses 5-8, wherein the providing of the at least one of the second content items to be loaded for presentation on the user device during the delay further comprises promoting the at least one of the second items to the head section of the page.

Clause 10: The system of any one of clauses 5-9, wherein the at least one of the second content items are initially designated to load in response to an onload event.

Clause 11: The system of any one of clauses 5-10, wherein the delay in presenting the at least one of the first content items is at least partly associated with one or more of:

a generation time to dynamically generate, at least in part, the at least one of the first content items;

a retrieval time to retrieve the at least one of the first content items from storage;

a transmission time to transmit the at least one of the first content items to the user device; or a load time to load the at least one of the first content items for presentation on the user device.

Clause 12: The system of any one of clauses 5-11, wherein the delay is determined based at least in part on determining that the user device is a mobile device.

Clause 13: One or more computer-readable media storing instructions which, when executed by at least one processor, instruct the at least one processor to perform actions comprising:

in response to receiving a request for a page of content, determining the page of content to be presented in a user interface, the page including a set of first content items and a set of second content items, the set of first content items being initially designated to load in the user interface prior to loading the set of second content items during a presentation of the page;

determining a delay in presenting at least one of the set of first content items, the delay based at least in part on a latency in receiving the at least one of the set of first content items from a remote server;

determining whether to promote at least one of the set of second content items based at least partly on a time for presenting the at least one of the set of second content items being less than or equal to the delay; and in response to determining to promote at least one of the set of second content items, promoting the at least one of the set of second content items, such that the at least one of the set of second content items is loaded in the user interface at least partly during the delay.

Clause 14: The one or more computer-readable media of clause 13, wherein the set of first content items include content previously identified as contributing to a completion of at least one transaction through the page.

Clause 15: The one or more computer-readable media of any one of clauses 13 and 14, wherein the set of first content items include one or more of: an image of a product available for purchase through the page; a description of the product; a price of the product; or a review of the product.

Clause 16: The one or more computer-readable media of any one of clauses 13-15, wherein:

the at least one of the set of first content items are initially designated to load prior to the set of second content items based on the at least one of the set of first content items being included in a head section of the page; and the at least one of the set of second content items are initially designated to load following the set of first content items, based on the at least one of the set of second content items being included in one or more sections of the page that are subsequent to the head section.

Clause 17: The one or more computer-readable media of any one of clauses 13-16, wherein the promoting of the at least one of the set of second content items includes promoting the at least one of the set of second content items to load in the head section of the page.

Clause 18: The one or more computer-readable media of any one of clauses 13-17, wherein the at least one of the set of second content items are designated to load in response to an onload event.

Clause 19: The one or more computer-readable media of any one of clauses 13-18, wherein the determining of the at least one of the set of second content items to be promoted is further based at least partly on one or more other pages previously navigated to within the user interface.

Clause 20: The one or more computer-readable media of any one of clauses 13-19, wherein the at least one of the set of second content items to be promoted includes content designated to be loaded in an absence of input events subsequent to an initial request for the page.

Clause 21: A computer-implemented method, comprising:
receiving from a user device a request for a web page, the web page including one or more first content items and one or more second content items, the one or more first content items including content previously identified as contributing to a completion of at least one transaction through the web page;
designating a first stream to communicate the one or more first content items to the user device and a second stream to communicate the one or more second content items to the user device, the first stream and the second stream included in a plurality of streams that are multiplexed by a multi-stream networking protocol to communicate with the user device;
based at least partly on data describing at least one previous presentation of the web page, determining a delay in presenting at least one of the one or more first content items;
determining whether to promote any of the one or more second content items to be loaded before the one or more first content items, wherein the determination of whether to promote any of the one or more second content items is based at least partly on a time for presenting at least one of the second content items being less than or equal to the delay;
in response to determining to promote at least one of the one or more second content items, writing the at least one of the second content items to the second stream, such that the at least one of the second content items is communicated to the user device at least partly during the delay; and
writing the one or more first content items to the first stream, such that the one or more first content items are communicated to the user device following the delay.

Clause 22: The method of clause 21, wherein the delay in presenting the at least one of the first content items is at least partly associated with one or more of:
a generation time to dynamically generate, at least in part, the at least one of the first content items;
a retrieval time to retrieve the at least one of the first content items from storage;
a transmission time to transmit the at least one of the first content items to the user device; or
a load time to load the at least one of the first content items for presentation on the user device.

Clause 23: The method of any one of clauses 21 and 22, wherein the web page is described at least partly using one or more of: HyperText Markup Language (HTML); JavaScript; Cascading Style Sheets (CSS); Scalable Vector Graphics (SVG); or Virtual Reality Modeling Language (VRML).

Clause 24: The method of any one of clauses 21-23, wherein the one or more first content items describe one or more of a product or a service that is available for purchase through the web page.

Clause 25: A system, comprising at least one computing device configured to implement one or more services, wherein the one or more services are configured to:
determine a page of content to be presented on a user device, the page including one or more first content items and one or more second content items;
designate a first stream to communicate the one or more first content items to the user device and a second stream to communicate the one or more second content items to the user device, the first stream and the second stream included in a plurality of streams that are multiplexed by a multi-stream networking protocol to communicate with the user device;
determine a delay in presenting at least one of the one or more first content items;
determine whether a time for presenting at least one of the one or more second content items is less than or equal to the delay; and
in response to determining that the time for presenting at least one of the one or more second content items is less than or equal to the delay, write the at least one of the second content items to the second stream, such that the at least one of the second content items is communicated to the user device at least partly during the delay, and write the one or more first content items to the first stream, such that the one or more first content items are communicated to the user device following the delay.

Clause 26: The system of clause 25, wherein the one or more first content items include content previously identified as contributing to a completion of at least one transaction through the page.

Clause 27: The system of any one of clauses 25 and 26, wherein the estimating of the delay is based at least partly on data describing at least one previous presentation of the page.

Clause 28: The system of any one of clauses 25-27, wherein:
the at least one of the first content items are initially designated to load prior to the one or more second content items based on the at least one of the first content items being included in a head section of the page; and
the at least one of the second content items are initially designated to load following the one or more first content items, based on the at least one of the second content items being included in one or more sections of the page that are subsequent to the head section.

Clause 29: The system of any one of clauses 25-28, wherein the multi-stream networking protocol multiplexes the plurality of streams within a single network connection to the user device.

Clause 30: The system of any one of clauses 25-29, wherein the multi-stream networking protocol employs a time-based multiplexing of data frames from the plurality of streams across the single network connection.

Clause 31: The system of any one of clauses 25-30, wherein the delay in presenting the at least one of the first content items is at least partly associated with one or more of:
a generation time to dynamically generate, at least in part, the at least one of the first content items;
a retrieval time to retrieve the at least one of the first content items from storage;

a transmission time to transmit the at least one of the first content items to the user device; or a load time to load the at least one of the first content items for presentation on the user device.

Clause 32: The system of any one of clauses 25-31, wherein the delay is determined based at least in part on determining that the user device is a mobile device.

Clause 33: One or more computer-readable media storing instructions which, when executed by at least one processor, instruct the at least one processor to perform actions comprising:

in response to receiving a request for a page of content, determining the page of content to be presented on a user device, the page including one or more first content items and one or more second content items;

designating a first stream to communicate the one or more first content items to the user device and a second stream to communicate the one or more second content items to the user device, the first stream and the second stream included in a plurality of streams of a multi-stream networking protocol, wherein the multi-stream networking protocol employs a time-based multiplexing of data frames from the plurality of streams to communicate with the user device across a single network connection;

determining a delay in presenting at least one of the one or more first content items;

determining at least one of the one or more second content items based at least partly on a time to present the at least one of the second content items being not greater than the delay; and writing the at least one of the second content items to the second stream, such that the at least one of the second content items is communicated to the user device at least partly during the delay.

Clause 34: The one or more computer-readable media of clause 33, wherein the one or more first content items include content previously identified as contributing to a completion of at least one transaction through the page.

Clause 35: The one or more computer-readable media of any one of clauses 33 and 34, wherein the one or more first content items include one or more of: an image of a product available for purchase through the page; a description of the product; a price of the product; or a review of the product.

Clause 36: The one or more computer-readable media of any one of clauses 33-35, wherein:

the at least one of the first content items are initially designated to load prior to the one or more second content items based on the at least one of the first content items being included in a head section of the page; and the at least one of the second content items are initially designated to load following the one or more first content items, based on the at least one of the second content items being included in one or more sections of the page that are subsequent to the head section.

Clause 37: The one or more computer-readable media of any one of clauses 33-36, the actions further comprising:

detecting an event generated by at least one process that dynamically generates the one or more first content items, the event indicating that the first content items are available; and based at least partly on the detecting of the event, writing the one or more first content items to the first stream, such that the one or more first content items are communicated to the user device following the delay.

Clause 38: The one or more computer-readable media of any one of clauses 33-37, the actions further comprising:

detecting a state transition of at least one process that dynamically generates the one or more first content items, the state transition indicating that the one or more first content items are available; and based at least partly on the detecting of the state transition, writing the one or more first content items to the first stream, such that the one or more first content items are communicated to the user device following the delay.

Clause 39: The one or more computer-readable media of any one of clauses 33-38, wherein the determining of the at least one of the second content items to be promoted is further based at least partly on one or more other pages previously navigated to within the user interface.

Clause 40: The one or more computer-readable media of any one of clauses 33-39, wherein the at least one of the second content items to be promoted includes content designated to be loaded in an absence of input events subsequent to an initial request for the page.

Clause 41: A computer-implemented method, comprising:

receiving from a user device a request for a web page, the web page including one or more first content items and one or more second content items, the one or more first content items being initially designated to load prior to the one or more second content items during a presentation of the web page, the one or more first content items being designated to be sent to the user device in one or more first packets, the one or more second content items being designated to be sent to the user device in one or more second packets that are initially designated to be sent after the sending of the one or more first packets, and the one or more first content items including content previously identified as contributing to a completion of at least one transaction through the web page;

based at least partly on data describing at least one previous presentation of the web page, determining a delay in presenting at least one of the one or more first content items;

determining at least one of the one or more second content items based at least partly on a time for presenting the at least one of the second content items being not greater than the delay;

sending, to the user device, at least one of the one or more second packets including the at least one of the second content items, prior to sending at least one of the one or more first packets that includes the at least one of the one or more first content items; and sending, to the user device, the at least one of the one or more first packets including the at least one of the one or more first content items.

Clause 42: The method of clause 41, wherein the delay in presenting the at least one of the first content items is at least partly associated with one or more of:

a generation time to dynamically generate, at least in part, the at least one of the first content items;

a retrieval time to retrieve the at least one of the first content items from storage;

a transmission time to transmit the at least one of the first content items to the user device; or a load time to load the at least one of the first content items for presentation on the user device.

Clause 43: The method of any one of clauses 41 and 42, wherein the web page is described at least partly using one or more of: Hypertext Markup Language (HTML); JavaScript; Cascading Style Sheets (CSS); Scalable Vector Graphics (SVG); or Virtual Reality Modeling Language (VRML).

Clause 44: The method of any one of clauses 41-43, wherein the one or more first packets and the one or more second packets include transport layer packets.

Clause 45: A system, comprising:
at least one computing device configured to implement one or more services, wherein the one or more services are configured to:
determine a page of content to be presented on a user device, the page including one or more first content items and one or more second content items, the one or more first content items being designated to be sent to the user device in one or more first packets, and the one or more second content items being designated to be sent to the user device in one or more second packets that are initially designated to be sent after the sending of the one or more first packets;
determine a delay in presenting at least one of the one or more first content items;
determine at least one of the one or more second content items based at least partly on a time for presenting the at least one of the second content items being not greater than the delay;
send, to the user device, at least one of the one or more second packets including the at least one of the second content items, prior to sending at least one of the one or more first packets that includes the at least one of the one or more first content items; and
send, to the user device, the at least one of the one or more first packets including the at least one of the one or more first content items.

Clause 46: The system of clause 45, wherein the one or more first content items include content previously identified as contributing to a completion of at least one transaction through the page.

Clause 47: The system of any one of clauses 45 and 46, wherein the determining of the delay is based at least partly on data describing at least one previous presentation of the page.

Clause 48: The system of any one of clauses 45-47, wherein:
the one or more first packets and the one or more second packets include first layer packets at a first layer of a multi-layer communications model; and
the sending of the at least one of the one or more second packets further comprises incorporating the at least one of the one or more second packets into one or more second layer packets that are sent prior to the sending of the at least one of the one or more first packets, the one or more second layer packets being at a lower layer of the multi-layer communications model than the first layer packets.

Clause 49: The system of any one of clauses 45-48, wherein the first layer packets include transport layer packets; and the one or more second layer packets include network layer packets.

Clause 50: The system of any one of clauses 45-49, wherein:
the first layer packets include one or more of Transmission Control Protocol (TCP) packets or Stream Control Transmission Protocol (SCTP) packets; and
the one or more second layer packets include Internet Protocol (IP) packets.

Clause 51: The system of any one of clauses 45-50, wherein the delay in presenting the at least one of the first content items is at least partly associated with one or more of:
a generation time to dynamically generate, at least in part, the at least one of the first content items;
a retrieval time to retrieve the at least one of the first content items from storage;
a transmission time to transmit the at least one of the first content items to the user device; or
a load time to load the at least one of the first content items for presentation on the user device.

Clause 52: The system of any one of clauses 45-51, wherein the delay is determined based at least in part on determining that the user device is a mobile device.

Clause 53: One or more computer-readable media storing instructions which, when executed by at least one processor, instruct the at least one processor to perform actions comprising:
determining a page of content to be presented on a user device, the page including one or more first content items and one or more second content items, the one or more first content items being designated to be sent to the user device in one or more first packets in a packet stream, and the one or more second content items being designated to be sent to the user device in one or more second packets that are initially designated to be sent after the sending of the one or more first packets in the packet stream;
determining a delay in presenting at least one of the one or more first content items;
determining at least one of the one or more second content items to be promoted based at least partly on a time for presenting the at least one of the second content items being not greater than the delay; and
promoting the at least one of the one or more second content items, including sending, in the packet stream to the user device, at least one of the one or more second packets prior to sending at least one of the one or more first packets that includes the at least one of the one or more first content items.

Clause 54: The one or more computer-readable media of clause 53, the actions further comprising:
allocating a portion of the packet stream to carry the at least one of the first packets after the at least one of the one or more second packets; and
sending, in the allocated portion of the packet stream, the at least one of the one or more first packets including the at least one of the one or more first content items.

Clause 55: The one or more computer-readable media of any one of clauses 53 and 54, wherein the at least one of the one or more first content items is generated based at least partly on a size of the allocated portion of the packet stream.

Clause 56: The one or more computer-readable media of any one of clauses 53-55, wherein:
the one or more first packets and the one or more second packets include first layer packets at a first layer of a multi-layer communications model; and
the sending of the at least one of the one or more second packets further comprises incorporating the at least one of the one or more second packets into one or more second layer packets that are sent prior to the sending of the at least one of the one or more first packets, the one or more second layer packets being at a lower layer of the multi-layer communications model than the first layer packets.

Clause 57: The one or more computer-readable media of any one of clauses 53-56, wherein the first layer packets include transport layer packets; and the one or more second layer packets include network layer packets.

Clause 58: The one or more computer-readable media of any one of clauses 53-57, wherein:
the first layer packets include one or more of Transmission Control Protocol (TCP) packets or Stream Control Transmission Protocol (SCTP) packets; and the one or more second layer packets include Internet Protocol (IP) packets.

Clause 59: The one or more computer-readable media of any one of clauses 53-58, the actions further comprising determining a congestion window such that the at least one of the one or more second packets are buffered on the user device prior to receipt of the at least one of the one or more first packets.

Clause 60: The one or more computer-readable media of any one of clauses 53-59, wherein the at least one of the second content items to be promoted includes content designated to be loaded in an absence of input events subsequent to an initial request for the page.

Clause 61: A computer-implemented method, comprising:
receiving from a user device a request for a web page, the web page including one or more first content items and one or more second content items, the one or more first content items being initially designated to load prior to the one or more second content items during a presentation of the web page, the one or more first content items being designated to be sent to the user device in one or more first frames, the one or more second content items being designated to be sent to the user device in one or more second frames that are initially designated to be sent after the sending of the one or more first frames, and the one or more first content items including content previously identified as contributing to a completion of at least one transaction through the web page;
based at least partly on data describing at least one previous presentation of the web page, determining a delay in presenting at least one of the one or more first content items;
determining at least one of the one or more second content items based at least partly on a time for presenting the at least one of the second content items being not greater than the delay;
sending, to the user device, at least one of the one or more second frames including the at least one of the second content items, prior to sending at least one of the one or more first frames that includes the at least one of the one or more first content items; and
sending, to the user device, the at least one of the one or more first frames including the at least one of the one or more first content items.

Clause 62: The method of clause 61, wherein the delay in presenting the at least one of the first content items is at least partly associated with one or more of:
a generation time to dynamically generate, at least in part, the at least one of the first content items;
a retrieval time to retrieve the at least one of the first content items from storage;
a transmission time to transmit the at least one of the first content items to the user device; or
a load time to load the at least one of the first content items for presentation on the user device.

Clause 63: The method of any one of clauses 61 and 62, wherein the web page is described at least partly using one or more of: Hypertext Markup Language (HTML); JavaScript; Cascading Style Sheets (CSS); Scalable Vector Graphics (SVG); or Virtual Reality Modeling Language (VRML).

Clause 64: The method of any one of clauses 61-63, wherein the one or more first frames and the one or more second frames include application layer frames.

Clause 65: A system, comprising:
at least one computing device configured to implement one or more services, wherein the one or more services are configured to:
determine a page of content to be presented on a user device, the page including one or more first content items and one or more second content items, the one or more first content items being designated to be sent to the user device in one or more first frames, and the one or more second content items being designated to be sent to the user device in one or more second frames that are initially designated to be sent after the sending of the one or more first frames;
determine a delay in presenting at least one of the one or more first content items;
determine at least one of the one or more second content items based at least partly on a time for presenting the at least one of the second content items being not greater than the delay;
send, to the user device, at least one of the one or more second frames including the at least one of the second content items, prior to sending at least one of the one or more first frames that includes the at least one of the one or more first content items; and
send, to the user device, the at least one of the one or more first frames including the at least one of the one or more first content items.

Clause 66: The system of clause 65, wherein the one or more first content items include content previously identified as contributing to a completion of at least one transaction through the page.

Clause 67: The system of any one of clauses 65 and 66, wherein the determining of the delay is based at least partly on data describing at least one previous presentation of the page.

Clause 68: The system of any one of clauses 65-67, wherein the one or more first frames and the one or more second frames include frames at a layer of a multi-layer communications model, the layer being higher than a transport layer of the multi-layer communications model.

Clause 69: The system of any one of clauses 65-68, wherein the one or more first frames and the one or more second frames include application layer frames.

Clause 70: The system of any one of clauses 65-69, wherein the application layer frames include data describing at least one Hypertext Transport Protocol (HTTP) communication.

Clause 71: The system of any one of clauses 65-70, wherein the delay in presenting the at least one of the first content items is at least partly associated with one or more of:
a generation time to dynamically generate, at least in part, the at least one of the first content items;
a retrieval time to retrieve the at least one of the first content items from storage;
a transmission time to transmit the at least one of the first content items to the user device; or
a load time to load the at least one of the first content items for presentation on the user device.

Clause 72: The system of any one of clauses 65-71, wherein the delay is determined based at least in part on determining that the user device is a mobile device.

Clause 73: One or more computer-readable media storing instructions which, when executed by at least one processor, instruct the at least one processor to perform actions comprising:
determining a page of content to be presented on a user device, the page including one or more first content items and one or more second content items, the one or more first content items being designated to be sent to the user device in one or more first frames in a frame sequence, and the one or more second content items being designated to be sent to the user device in one or more second frames that are initially designated to be sent after the sending of the one or more first frames in the frame sequence;

determining a delay in presenting at least one of the one or more first content items;

determining at least one of the one or more second content items to be promoted based at least partly on a time for presenting the at least one of the second content items being not greater than the delay; and promoting the at least one of the one or more second content items, including sending, in the frame sequence to the user device, at least one of the one or more second frames prior to sending at least one of the one or more first frames that includes the at least one of the one or more first content items.

Clause 74: The one or more computer-readable media of clause 73, wherein the one or more first content items include content previously identified as contributing to a completion of at least one transaction through the page.

Clause 75: The one or more computer-readable media of any one of clauses 73 and 74, wherein the first content items include one or more of: an image of a product available for purchase through the page; a description of the product; a price of the product; or a review of the product.

Clause 76: The one or more computer-readable media of any one of clauses 73-75, wherein the one or more first frames and the one or more second frames include frames at a layer of a multi-layer communications model, the layer being higher than a transport layer of the multi-layer communications model.

Clause 77: The one or more computer-readable media of any one of clauses 73-76, wherein the one or more first frames and the one or more second frames include application layer frames.

Clause 78: The one or more computer-readable media of any one of clauses 73-77, the actions further comprising:

allocating a portion of the frame sequence to carry the at least one of the first frames after the at least one of the one or more second frames; and sending, in the allocated portion of the frame sequence, the at least one of the one or more first frames including the at least one of the one or more first content items.

Clause 79: The one or more computer-readable media of any one of clauses 73-78, wherein a compression of the at least one of the one or more first content items is altered based at least partly on a size of the allocated portion of the frame sequence.

Clause 80: The one or more computer-readable media of any one of clauses 73-79, wherein the at least one of the second content items to be promoted includes content designated to be loaded in an absence of input events subsequent to an initial request for the page.

Clause 81: A computer-implemented method, comprising:

receiving from a user device a request for a web page, the web page including metadata tags that reference content items to be requested for presentation of the web page;

determining a suggested order for requesting the content items during the presentation of the web page, the suggested order being different than a listed order of the metadata tags in the web page;

incorporating, into the web page, priority indicators indicating the suggested order for requesting the content items, the priority indicators including one or more metadata attributes that are included in the metadata tags that reference the content items; and sending, to the user device, the web page including the priority indicators.

Clause 82: The method of clause 81, wherein the determining of the suggested order for requesting the content items further comprises:

determining a delay in presenting at least one first content item of the content items;

determining at least one second content item of the content items based at least partly on a time for presenting the at least one second content item being not greater than the delay; and determining the suggested order such that the at least one second content item is requested prior to the at least one first content item.

Clause 83: The method of any one of clauses 81 and 82, wherein the delay in presenting the at least one first content item is at least partly associated with one or more of:

a generation time to dynamically generate, at least in part, the at least one first content item;

a retrieval time to retrieve the at least one first content item from storage;

a transmission time to transmit the at least one first content item to the user device; or a load time to load the at least one first content item for presentation on the user device.

Clause 84: The method of any one of clauses 81-83, wherein the web page is described at least partly using one or more of: Hypertext Markup Language (HTML); JavaScript; Cascading Style Sheets (CSS); Scalable Vector Graphics (SVG); or Virtual Reality Modeling Language (VRML).

Clause 85: A system, comprising:

at least one computing device configured to implement one or more services, wherein the one or more services are configured to:

determine a page of content to be presented on a user device, the page including references to content items to be requested for presentation of the page;

determine a suggested order for requesting the content items during the presentation of the page, the suggested order being different than a listed order of the references to the content items in the page;

incorporate, into the page, priority indicators indicating the suggested order for requesting the content items; and send, to the user device, the page including the priority indicators.

Clause 86: The system of clause 85, wherein:

the references to the content items in the page include metadata tags that reference the content items; and the priority indicators include one or more metadata attributes that are included in the metadata tags.

Clause 87: The system of any one of clauses 85 and 86, wherein the metadata tags include Hypertext Markup Language (HTML) tags.

Clause 88: The system of any one of clauses 85-87, wherein the determining of the suggested order for requesting the content items further comprises:

determining a delay in presenting at least one first content item of the content items;

determining at least one second content item of the content items based at least partly on a time for presenting the at least one second content item being not greater than the delay; and determining the suggested order such that the at least one second content item is requested prior to the at least one first content item.

Clause 89: The system of any one of clauses 85-88, wherein the determining of the at least one second content item is further based at least partly on a determination that loading one or more other content items of the page depends on prior loading of the at least one second content item.

Clause 90: The system of any one of clauses 85-89, wherein the determining of the at least one second content item is based at least partly on a determination that the at least one second content item includes content previously identified as contributing to a completion of at least one transaction through the page.

Clause 91: The system of any one of clauses 85-90, wherein the determining of the delay is based at least partly on data describing at least one previous presentation of the page.

Clause 92: The system of any one of clauses 85-91, wherein the delay is determined based at least in part on determining that the user device is a mobile device.

Clause 93: The system of any one of clauses 85-92, wherein the delay in presenting the at least one first content item is at least partly associated with one or more of:
  a generation time to dynamically generate, at least in part, the at least one first content item;
  a retrieval time to retrieve the at least one first content item from storage;
  a transmission time to transmit the at least one first content item to the user device; or
  a load time to load the at least one first content item for presentation on the user device.

Clause 94: One or more computer-readable media storing instructions which, when executed by at least one processor, instruct the at least one processor to perform actions comprising:
  receiving a page of content to be presented on a user device, the page including references to content items to be requested for presentation of the page, the references to the content items including at least one priority indicator indicating a suggested order for requesting the content items that is different than a listed order of the references in the page;
  determining an order in which to request the content items, based at least partly on the suggested order indicated by the at least one priority indicator; and
  requesting the content items in the determined order.

Clause 95: The one or more computer-readable media of clause 94, wherein:
  the references to the content items including at least one metadata tag associated with at least one of the content items; and
  the at least one priority indicator including at least one metadata attribute included in the at least one metadata tag.

Clause 96: The one or more computer-readable media of any one of clauses 94 and 95, wherein the at least one metadata tag includes at least one Hypertext Markup Language (HTML) tag.

Clause 97: The one or more computer-readable media of any one of clauses 94-96, wherein the determining of the order in which to request the content items is further based at least partly on determining that one or more of the content items are cached in memory on the user device.

Clause 98: The one or more computer-readable media of any one of clauses 94-97, wherein the determining of the order in which to request the content items is further based at least partly on current network conditions of one or more networks that enable communication between the user device and one or more other devices.

Clause 99: The one or more computer-readable media of any one of clauses 94-98, wherein:
  the at least one priority indicator indicates at least one priority level within a priority hierarchy that includes multiple priority levels; and
  the determining of the order in which to request the content items is further based at least partly on the at least one priority level indicated by the at least one priority indicator.

Clause 100: The one or more computer-readable media of any one of clauses 94-99, wherein the multiple priority levels include priority levels corresponding to one or more of: a user experience characteristic of the content items; a page layout characteristic of the content items; or a code dependency characteristic of the content items.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
  receiving from a user device a request for a web page, the web page including one or more first content items and one or more second content items, the one or more first content items being initially designated to load prior to the one or more second content items during a presentation of the web page, the one or more first content items being designated to be sent to the user device in one or more first packets, the one or more second content items being designated to be sent to the user device in one or more second packets that are initially designated to be sent after the sending of the one or more first packets, and the one or more first content items including content previously identified as contributing to a completion of at least one transaction through the web page;
  based at least partly on data describing at least one previous presentation of the web page, determining a delay in presenting at least one of the one or more first content items;
  determining at least one of the one or more second content items having a cumulative presentation time at the user device not greater than the delay in presenting the at least one of the one or more first content items;
  sending, in at least one of the one or more second packets to the user device, the at least one of the second content items having the cumulative presentation time at the user device not greater than the delay in presenting the at least one of the one or more first content items, prior to sending at least one of the one or more first packets that includes the at least one of the one or more first content items; and
  sending, to the user device, the at least one of the one or more first packets including the at least one of the one or more first content items after the delay and the at least one of the second content items have been sent.

2. The method of claim 1, wherein the delay in presenting the at least one of the first content items is at least partly associated with one or more of:
  a generation time to dynamically generate, at least in part, the at least one of the first content items;
  a retrieval time to retrieve the at least one of the first content items from storage;
  a transmission time to transmit the at least one of the first content items to the user device; or
  a load time to load the at least one of the first content items for presentation on the user device.

3. The method of claim 1, wherein the web page is described at least partly using one or more of:

Hypertext Markup Language (HTML);
JavaScript;
Cascading Style Sheets (CSS);
Scalable Vector Graphics (SVG); or
Virtual Reality Modeling Language (VRML).

4. The method of claim 1, wherein the one or more first packets and the one or more second packets include transport layer packets.

5. A system, comprising:
at least one computing device configured to implement one or more services, wherein the one or more services are configured to:
determine a page of content to be presented on a user device, the page including one or more first content items and one or more second content items, the one or more first content items being initially designated to be sent to the user device in one or more first packets, and the one or more second content items being initially designated to be sent to the user device in one or more second packets that are initially designated to be sent after the sending of the one or more first packets;
determine a delay in presenting at least one of the one or more first content items;
determine at least one of the one or more second content items having a cumulative presentation time at the user device not greater than the delay in presenting the at least one of the one or more first content items;
send, in at least one of the one or more second packets to the user device, the at least one of the second content items having the cumulative presentation time at the user device not greater than the delay in presenting the at least one of the one or more first content items, prior to sending at least one of the one or more first packets that includes the at least one of the one or more first content items; and
send, to the user device, the at least one of the one or more first packets including the at least one of the one or more first content items after the delay and the at least one of the second content items, having the cumulative presentation time at the user device not greater than the delay, have been sent.

6. The system of claim 5, wherein the one or more first content items include content previously identified as contributing to a completion of at least one transaction through the page.

7. The system of claim 5, wherein the determining of the delay is based at least partly on data describing at least one previous presentation of the page.

8. The system of claim 5, wherein:
the one or more first packets and the one or more second packets include first layer packets at a first layer of a multi-layer communications model; and
the sending of the at least one of the one or more second packets further comprises incorporating the at least one of the one or more second packets into one or more second layer packets that are sent prior to the sending of the at least one of the one or more first packets, the one or more second layer packets being at a lower layer of the multi-layer communications model than the first layer packets.

9. The system of claim 8, wherein:
the first layer packets include transport layer packets; and
the one or more second layer packets include network layer packets.

10. The system of claim 9, wherein:
the first layer packets include one or more of Transmission Control Protocol (TCP) packets or Stream Control Transmission Protocol (SCTP) packets; and
the one or more second layer packets include Internet Protocol (IP) packets.

11. The system of claim 5, wherein the delay in presenting the at least one of the first content items is at least partly associated with one or more of:
a generation time to dynamically generate, at least in part, the at least one of the first content items;
a retrieval time to retrieve the at least one of the first content items from storage;
a transmission time to transmit the at least one of the first content items to the user device; or
a load time to load the at least one of the first content items for presentation on the user device.

12. The system of claim 5, wherein the delay is determined based at least in part on determining that the user device is a mobile device.

13. One or more computer-readable media storing instructions which, when executed by at least one processor, instruct the at least one processor to perform actions comprising:
determining a page of content to be presented on a user device, the page including one or more first content items and one or more second content items, the one or more first content items being initially designated to be sent to the user device in one or more first packets in a packet stream, and the one or more second content items being initially designated to be sent to the user device in one or more second packets that are initially designated to be sent after the sending of the one or more first packets in the packet stream;
determining a delay in presenting at least one of the one or more first content items;
determining at least one of the one or more second content items to be promoted having a cumulative presentation time at the user device not greater than the delay; and
promoting the at least one of the one or more second content items having the cumulative presentation time not greater than the delay in presenting the at least one of the one or more first content items, the promoting the at least one of the one or more second content items including sending, in the packet stream to the user device during the delay, at least one of the one or more second packets having the cumulative presentation time not greater than the delay prior to sending at least one of the one or more first packets that includes the at least one of the one or more first content items.

14. The one or more computer-readable media of claim 13, the actions further comprising:
allocating a portion of the packet stream to carry the at least one of the first packets after the at least one of the one or more second packets; and
sending, in the allocated portion of the packet stream, the at least one of the one or more first packets including the at least one of the one or more first content items.

15. The one or more computer-readable media of claim 14, wherein the at least one of the one or more first content items is generated based at least partly on a size of the allocated portion of the packet stream.

16. The one or more computer-readable media of claim 13, wherein:
the one or more first packets and the one or more second packets include first layer packets at a first layer of a multi-layer communications model; and the sending of the at least one of the one or more second packets further comprises incorporating the at least one of the one or more second packets into one or more second layer packets that are sent prior to the sending of the at least one of the one or more first packets, the one or more second layer packets being at a lower layer of the multi-layer communications model than the first layer packets.

17. The one or more computer-readable media of claim 16, wherein:
the first layer packets include transport layer packets; and
the one or more second layer packets include network layer packets.

18. The one or more computer-readable media of claim 17, wherein:
the first layer packets include one or more of Transmission Control Protocol (TCP) packets or Stream Control Transmission Protocol (SCTP) packets; and
the one or more second layer packets include Internet Protocol (IP) packets.

19. The one or more computer-readable media of claim 13, the actions further comprising:
determining a congestion window such that the at least one of the one or more second packets are buffered on the user device prior to receipt of the at least one of the one or more first packets.

20. The one or more computer-readable media of claim 13, wherein
the at least one of the second content items to be promoted having the cumulative presentation time at the user device not greater than the delay includes content initially designated to be loaded in an absence of input events subsequent to an initial request for the page.

* * * * *